US012762682B2

(12) United States Patent
Cigno et al.

(10) Patent No.: US 12,762,682 B2
(45) Date of Patent: Oct. 13, 2026

(54) SYSTEMS AND METHODS FOR INSPECTING HONEYCOMB CERAMIC STRUCTURES USING X-RAY CT IMAGING

(71) Applicant: CORNING INCORPORATED, Corning, NY (US)

(72) Inventors: Patrick Garret Cigno, Corning, NY (US); Jeffrey Thomas Drake, Las Cruces, NM (US); Jerry Lee Hepburn, Corning, NY (US); Corey Thomas Janisch, Durham, NC (US); Robert John Locker, Corning, NY (US); David John Worthey, Pine City, NY (US)

(73) Assignee: CORNING INCORPORATED, Corning, NY (US)

( * ) Notice: Subject to any disclaimer, the term of this patent is extended or adjusted under 35 U.S.C. 154(b) by 338 days.

(21) Appl. No.: 18/577,316

(22) PCT Filed: Jun. 30, 2022

(86) PCT No.: PCT/US2022/035732
§ 371 (c)(1),
(2) Date: Jan. 8, 2024

(87) PCT Pub. No.: WO2023/287591
PCT Pub. Date: Jan. 19, 2023

(65) Prior Publication Data

US 2024/0386540 A1 Nov. 21, 2024

Related U.S. Application Data

(60) Provisional application No. 63/222,696, filed on Jul. 16, 2021.

(51) Int. Cl.
*G06T 7/00* (2017.01)
*G01N 23/046* (2018.01)
(Continued)

(52) U.S. Cl.
CPC ......... *G06T 7/0004* (2013.01); *G01N 23/046* (2013.01); *G01N 23/083* (2013.01);
(Continued)

(58) Field of Classification Search
None
See application file for complete search history.

(56) References Cited

U.S. PATENT DOCUMENTS 7,564,944 B2 * 7/2009 Kato .................... G01N 23/046 378/58
11,175,243 B1 * 11/2021 Yun ...................... G01N 23/041
(Continued)

FOREIGN PATENT DOCUMENTS

CN 103543168 A 1/2014
EP 3764089 A1 * 1/2021 ........... G06T 7/0004
(Continued)

OTHER PUBLICATIONS

Václavík Marek et al: "Structure characterisation of catalytic particulate filters for automotive exhaust gas aftertreatment", Materials Characterization, Elsevier, New York, NY, US, vol. 134, Nov. 4, 2017 (Nov. 4, 2017), pp. 311-318, XP085298412. (Year: 2017).*
(Continued)

*Primary Examiner* — Abderrahim Merouan
*Assistant Examiner* — Pawan Dhingra
(74) *Attorney, Agent, or Firm* — Kevin M. Able

(57) ABSTRACT

Systems and methods for manufacturing and inspecting a honeycomb structure. A method for inspecting includes generating a three-dimensional volume file of the honeycomb structure from x-ray images. The three-dimensional volume file is reduced to two-dimensional data sets. One or more structural features of interest are tracked through the three-dimensional volume file by identifying a portion of the structural feature in a plurality of the two-dimensional data
(Continued)

sets. A geometric contour of the structural feature of interest is derived from data corresponding to the structure feature of interest in the two-dimensional data sets. A planar representation of the structural feature of interest is created by extracting data from the three-dimensional volume file in accordance with the geometric contour. At least one structural condition of the honeycomb structure is determined based on the planar representation of the structural feature of interest.

23 Claims, 13 Drawing Sheets

(51) Int. Cl.
*G01N 23/083* (2018.01)
*G06T 3/14* (2024.01)
*G06T 3/60* (2006.01)
*G06T 7/60* (2017.01)

(52) U.S. Cl.
CPC .................. *G06T 3/14* (2024.01); *G06T 3/60* (2013.01); *G06T 7/60* (2013.01); *G01N 2223/401* (2013.01); *G06T 2200/04* (2013.01); *G06T 2207/10081* (2013.01); *G06T 2207/10116* (2013.01)

(56) References Cited

U.S. PATENT DOCUMENTS 11,688,067 B2 * 6/2023 Adler .................... G01N 23/04 382/128
2011/0189440 A1 * 8/2011 Appleby .................. B22C 9/04 523/435
2015/0081029 A1 * 3/2015 Bojarski ............ A61F 2/30942 606/88
2016/0331467 A1 * 11/2016 Slamin .................. A61B 34/20
2023/0047211 A1 * 2/2023 Abuelwafa ............ G06T 17/20

FOREIGN PATENT DOCUMENTS

EP 3953661 B1 * 10/2022 ........ G01M 17/0078
JP 2001-201465 A 7/2001
WO WO-2021011341 A1 * 1/2021 ............ G06F 18/24

OTHER PUBLICATIONS

Rivera Adrian: "Characterization and Modeling of Cell Wall imperfections in Aluminum Honeycomb Cores using X-ray CT Imaging",Jan. 4, 2021 (Jan. 4, 2021), XP055971337. URL: https://doi.org/10.2514/6.2021-1620 (Year: 2021).*

International Search Report and Written Opinion of the International Searching Authority; PCT/US22/035732; mailed on Nov. 8, 2022, 13 pages; European Patent Office.

Rivera Adrian: "Characterization and Modeling of Cell Wall Imperfections in Aluminum Honeycomb Cores using X-ray CT Imaging", Jan. 4, 2021 (Jan. 4, 2021), 15 pages.

Vaclavik Marek et al: "Structure characterisation of catalytic particulate filters for automotive exhaust gas aftertreatment", Materials Characterization, Elsevier, New York, NY, US, vol. 134, Nov. 4, 2017 (Nov. 4, 2017), pp. 311-318.

* cited by examiner

SYSTEMS AND METHODS FOR INSPECTING HONEYCOMB CERAMIC STRUCTURES USING X-RAY CT IMAGING

CROSS REFERENCE TO RELATED APPLICATION

This is a national stage application under 35 U.S.C. § 371 of International Application No. PCT/US2022/035732, filed on Jun. 30, 2022, which claims the benefit of priority under 35 U.S.C. § 119 of U.S. Provisional Application Ser. No. 63/222,696 filed on Jul. 16, 2021, the content of which is relied upon and incorporated herein by reference in their entireties.

BACKGROUND

The present disclosure generally relates to systems and methods for inspecting honeycomb ceramic structures, such as those that are used in gas particulate filters (GPF), diesel particulate filters (DPF), and catalytic converters to treat unwanted components in a working fluid, such as pollutants in a combustion exhaust, and in particular to systems and methods for inspecting honeycomb ceramic structures using X-ray computed tomography (CT) techniques.

SUMMARY

Various approaches are described herein for, among other things, providing improved manufacture and inspection of a honeycomb ceramic structure using X-ray CT imaging techniques. For instance, a method for inspecting a honeycomb ceramic structure comprises generating a three-dimensional volume file, such as from a plurality of x-ray images obtained by irradiating a periphery of a honeycomb ceramic structure with x-rays. The three-dimensional volume file is reduced to two-dimensional data sets, such as by taking cross-sectional slices of the three-dimensional volume file. One or more structural features of interest, such as a web plane or a plugged cell, are tracked through the three-dimensional volume, such as by identifying portions of the structural feature(s) in the two-dimensional data sets and relating the portions together. A geometric contour representative of the actual geometry of the structural feature(s) is derived from the data corresponding to the structural feature(s) in the two-dimensional data sets. A planar representation is generated from intensity data extracted from the three-dimensional volume file in accordance with the geometric contour. The planar representation for each structural feature can then be analyzed to determine a structural condition of the structural feature.

The systems and methods disclosed herein can be used to provide quick feedback during manufacturing to reveal whether the honeycomb ceramic structures are free of meaningful structural irregularities. The systems and methods disclosed herein can also be used to inspect a small portion of a manufacturing production population to provide a statistically significant measure as to whether there are meaningful structural irregularities in the manufacturing production population. Applicant has recognized and appreciated that physical or structural conditions of honeycomb ceramic structures can be detected and analyzed automatically and accurately using X-ray CT imaging and rapid contrast-based image analysis techniques. X-ray CT imaging techniques without the rapid contrast-based image analysis techniques can only be used to spot-check an occasional honeycomb ceramic structure during manufacturing because it requires a qualitative assessment of the images by a human being which is costly and time-consuming. Using X-ray CT imaging and rapid contrast-based image analysis techniques provide an accurate quantitative assessment of the images without requiring any assessment by a human being.

All examples and features mentioned below can be combined in any technically possible way.

In some embodiments, a method for inspecting a honeycomb structure comprises generating a three-dimensional volume file of the honeycomb structure from x-ray images; reducing the three-dimensional volume file to two-dimensional data sets; tracking one or more structural features of interest through the three-dimensional volume file by identifying a portion of the structural feature in a plurality of the two-dimensional data sets; deriving a geometric contour of the structural feature of interest from data corresponding to the structure feature of interest in the two-dimensional data sets; creating a planar representation of the structural feature of interest by extracting data from the three-dimensional volume file in accordance with the geometric contour; and determining at least one structural condition of the honeycomb structure based on the planar representation of the structural feature of interest.

In some embodiments, the honeycomb structure comprises an array of intersecting walls, wherein the walls extend transversely across the honeycomb structure in a plurality of web planes.

In some embodiments, the structural feature of interest is one or more web planes and the geometric contour comprises a series of line segments that travel along the walls for each of the one or more web planes.

In some embodiments, generating the geometric contour comprises: beginning a first line segment of the series of line segments at a thickness-wise center of one of the walls of the honeycomb structure; detecting a deviation in the center of the wall of the honeycomb structure at a location along the wall spaced from the beginning of the first line segment; terminating the first line segment at the location of the deviation; and beginning a second line segment of the series of line segments at an end of the first line segment.

In some embodiments, the deviation is determined as a distance or angle that is greater than a predetermined threshold value.

In some embodiments, reducing the three-dimensional volume file comprises: slicing the three-dimensional volume file into a sequence of cross-sectional slices, each cross-sectional slice having a thickness measured along an axial length of the honeycomb structure, and generating each of the two-dimensional data sets as axially-projected intensity data of a corresponding one of the cross-sectional slices of the three-dimensional file.

In some embodiments, the thickness of the cross-sectional slices is from 50 μm to 200 μm.

In some embodiments, the geometric contour of the structure feature is generated as a plurality an individual geometric contours that respectively correspond to each of the portions of the structural feature identified in the two-dimensional data sets of the cross-sectional slices.

In some embodiments, the structural feature of interest is one or more web planes along which walls of the honeycomb structure extend, and each of the individual geometric contours comprises a series of line segments that travel along the walls for each of the one or more web planes.

In some embodiments, the series of line segments travels along a thickness-wise center line for each of the one or more web planes.

In some embodiments, the structural feature of interest is one or more plugged cells of the honeycomb structure, and each of the individual geometric contours comprises a cross-section of each plugged channel.

In some embodiments, the cross-section of each plugged channel is taken between diagonally opposite corner posts of the plugged cell.

In some embodiments, creating the planar representation comprises extracting intensity data from the three-dimensional volume file for each of the individual geometric contours, and projecting the intensity data onto a plane in axial layers having the axial thicknesses of the cross-sectional slices corresponding to two-dimensional data set from which each of the individual geometric contours was generated.

In some embodiments, the method further comprises orienting the three-dimensional volume file such that the one or more regions of interest comprising at least one web plane can be followed along the axial length of the honeycomb structure.

In some embodiments, determining the at least one structural condition comprises determining that the at least one structural condition is at least one of an irregularity-free structure, a non-knit, a thin-web, an inclusion, a pin hole, a tear, a crack, a geometric variation, and a non-uniformity in any component added to the honeycomb ceramic structure.

In some embodiments, the method further comprises determining a size of the at least one structural condition.

In some embodiments, determining the at least one structural condition comprises analyzing the planar representation for variations in intensity that are greater than a threshold variation value.

In some embodiments, the one or more structural features of interest comprise one or more web planes along which walls of the honeycomb structure extend, and creating the planar representation further comprises filtering out regularly occurring variations in intensity on the planar representation that correspond to regular intersections between the walls along each of the one or more web planes.

In some embodiments, creating the planar representation further comprises determining or obtaining a global threshold value of intensity and suppressing at least one noisy area to increase a signal-to-noise ratio.

In some embodiments, creating the planar representation further comprising determining or obtaining a ratio of cell openings to wall thickness and measuring and subtracting x-ray noise based on the ratio to increase a signal-to-noise ratio.

In some embodiments, the method further comprises irradiating a periphery of the honeycomb structure with x-rays to generate the x-ray images.

In some embodiments, irradiating the periphery of the honeycomb structure comprises orienting the honeycomb structure at an angle relative to an axis of irradiation of a source of irradiation such that each x-ray image is at an angle relative to an end face of the honeycomb ceramic structure.

In some embodiments, the method further comprises rotating data of the three-dimensional volume file to align the honeycomb ceramic structure with at least one analysis axis prior to reducing the three-dimensional volume file to two-dimensional data sets.

In some embodiments, the method further comprises displaying, on a display, information of the at least one structural condition in the honeycomb ceramic structure.

In some embodiments, displaying the information comprises displaying one or more indications indicative of a location of the at least one structural condition.

In some embodiments, identifying the portions of the one or more structural features of interest comprises identifying plugged and unplugged cells of the honeycomb ceramic structure, and wherein identifying the plugged and unplugged cells comprises: identifying locations of the walls and cell interiors between the walls; taking a cross-section through each cell interior between the walls; and sampling intensity values of the three-dimensional volume file along the cross-section of each cell interior.

In some embodiments, the cross-section is taken diagonally through the cell interior.

In some embodiments, the at least one structural condition comprises a plug length, an effective plug depth, a concavity in plug material of the plugged cell, an internal void in the plug material, an extra plugged cell, or an absent plugged cell, or a periodic variation in plug length among the plugged cells.

In some embodiments, the method further comprises displaying, on a display, at least one of the two-dimensional cross-sectional views of the identified plugged cells showing the at least one structural condition identified or one or more indications that are related to the at least one structural condition identified.

In some embodiments, the honeycomb structure is in a ceramic fired state or a ceramic green state.

In some embodiments, a method of manufacturing a ceramic honeycomb structure comprises extruding a ceramic-forming mixture to form a honeycomb structure; and inspecting the honeycomb structure according to the method of any of the preceding embodiments.

In some embodiments, the inspecting occurs when the honeycomb structure is in a green state.

In some embodiments, the method further comprises firing the honeycomb structure, and wherein the inspecting occurs after the firing.

In some embodiments, a method for inspecting a honeycomb structure comprises irradiating, by a scanner, a periphery of a honeycomb structure with x-rays; generating, by one or more processors, a three-dimensional volume file from x-ray images; reducing, by the one or more processors, the three-dimensional volume file to two-dimensional data sets; identifying, by the one or more processors, one or more structural features of interest in the two-dimensional data sets of the three-dimensional volume file; deriving, by the one or more processors, a geometric contour of one or more structural features from the two-dimensional data set; creating, by the one or more processors, a planar representation for each of the one or more structural features of interest from the three-dimensional volume file based on the geometric contour; and determining, by the one or more processors, at least one structural condition of the honeycomb ceramic structure based on the planar representation of the structural feature of interest.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS

In the accompanying drawings, like reference characters generally refer to the same parts throughout the different views. Also, the drawings are not necessarily to scale, emphasis instead generally being placed upon illustrating the principles of the present disclosure.

Figure 1:
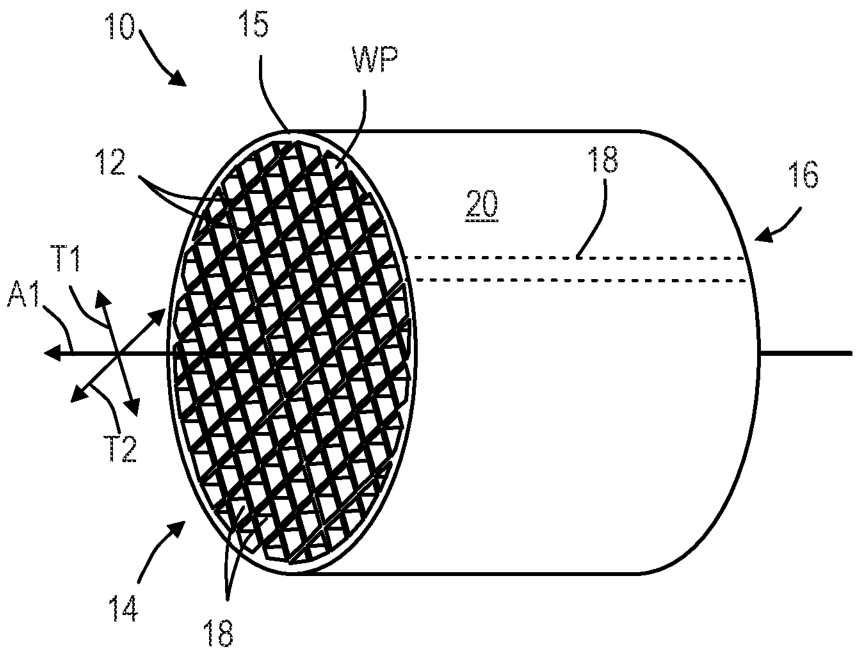
FIG. 1 is a perspective view of an exemplary honeycomb ceramic structure, according to aspects of the present disclosure.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF EMBODIMENTS

The following detailed description refers to the accompanying drawings that illustrate embodiments of the present disclosure. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example," "an aspect," or the like, indicate that the embodiment described may include a particular feature, structure or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

References in the specification to "a condition," "a physical condition," and "a structural condition," or the like, refer to any deviation or variation in the components forming the honeycomb ceramic structure, one or more patterns of plugged cells on the end faces, the plugging material in plugged cells, and any component added to the walls or the plugging material, e.g., catalyst or metal washcoat. In embodiments, a physical or structural condition refers to a deviation or variation that is outside of a predetermined allowable limit. An exemplary deviation or variation in the intersecting walls is a geometric distortion affecting the overall shape of the part. Another exemplary deviation or variation in the walls is a gap that is greater than a threshold size, such as along a significant portion of the axial length of the part. Another exemplary deviation or variation in the walls is a region that has an extruded material density that is significantly lower than that of the surrounding area. Another exemplary deviation or variation in the walls is a pin hole that is larger than a typical pore structure of the walls. Other exemplary deviations or variations in the walls include tears and cracks.

An exemplary deviation or variation in the pattern of plugged cells on the end faces is one or more extra plugged cells. Another exemplary deviation or variation in the pattern of plugged cells on the end faces is one or more missing plugged cells. An exemplary deviation or variation in the plugging material is one or more plugged cells that is longer than nominal. Another exemplary deviation or variation in the plugging material is one or more plugged cells that is shorter than nominal. Another exemplary deviation or variation in the plugging material is an effective plug length that differs from a predetermine value or range of values by a predetermined allowable amount. Another exemplary deviation or variation in the plugging material is a concavity in the face of the plug. Another exemplary deviation or variation in the plugging material is a concavity in the face of the plug that extends down into the plugging material by an amount. In embodiments, the amount is greater than a predetermined value. Another exemplary deviation or variation in the plugging material is an unfilled hole or void that is internal to the plug and not detectable from the face of the part. In embodiments, the unfilled hole or void is larger than a predetermined value. An exemplary deviation or variation in a component (e.g., washcoat) added to the walls is a non-uniformity or a change in thickness of an applied coating, layer, deposition, or washcoat. The deviations or variations enumerated above are not to be meant to be limiting. Any deviations or variations in the honeycomb ceramic structure are contemplated.

Embodiments disclosed herein provide improvements over known inspection systems utilized for inspecting a honeycomb ceramic structure. Ceramic substrates and filter products may need to meet product geometric specifications in order to assist emissions systems employing such substrates and filters to meet government regulated emissions standards. Indirect measurement techniques such as ultrasound and water nebulizer leakage tests may be satisfactory in some instances, but offer a qualitative assessment of product anomalies and leakage. Advantages of the embodiments disclosed herein include providing quick feedback during manufacturing to reveal whether the products are free of meaningful structural irregularities and the ability to inspect a small percentage of a production population to provide a statistically significant measure as to whether there are meaningful structural irregularities in the production population. The disclosed embodiments provide quantitative assessments with sufficient details and avoid the need for manual product assessments (i.e., performed by human beings) which are costly and time-consuming. The embodiments provide automated image analysis of a honeycomb ceramic structure based on computed tomography (CT) imaging technology.

Figure 2:
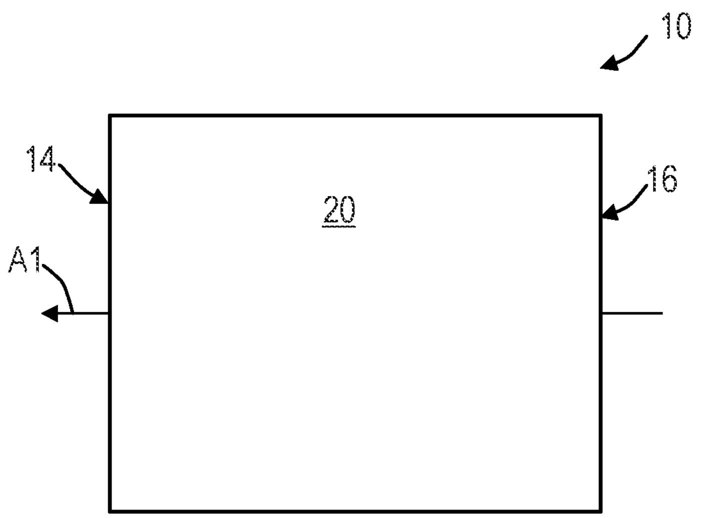
FIG. 2 is a side view of the honeycomb ceramic structure of FIG. 1, according to aspects of the present disclosure.
Figure 3:
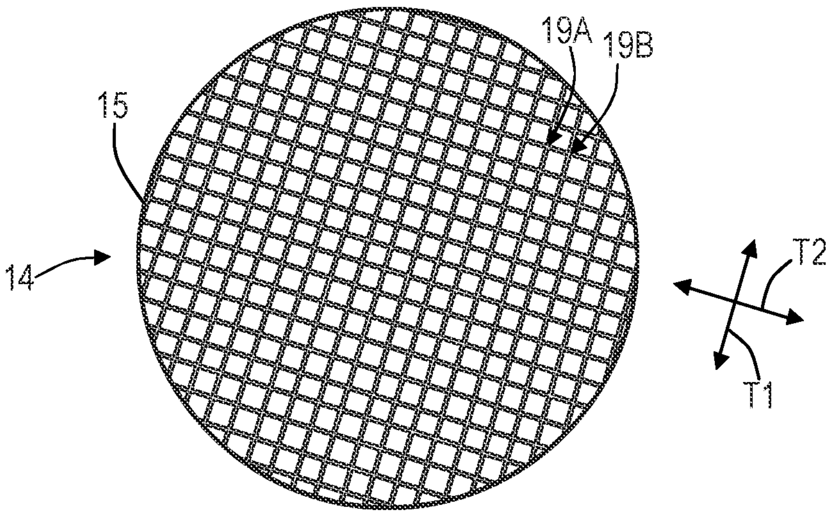
FIG. 3 is a front end view of the honeycomb ceramic structure of FIG. 1, according to aspects of the present disclosure.

FIG. 1 is a perspective view of an exemplary honeycomb ceramic structure 10. FIG. 2 is a side view of the honeycomb ceramic structure 10 of FIG. 1. FIG. 3 is an end view of the honeycomb ceramic structure 10 of FIG. 1. The following should be viewed with reference to FIGS. 1-3. Honeycomb ceramic structure 10 has a central axis A1 that defines an axial (longitudinal) direction. Honeycomb ceramic structure 10 further comprises a matrix of intersecting, thin, porous walls 12 that extend longitudinally through the structure 10 along axis A1 from end face 14 to end face 16. The matrix of walls 12 also extends across end faces 14 and 16. Outer skin 15 surrounds the matrix of walls 12. Walls 12 define a plurality of adjoining hollow channels, or "cells" 18, that extend through the structure 10 along axis A1 and form the cellular honeycomb construction of the honeycomb structure 10. In some embodiments, the honeycomb structure 10 is constructed from porous ceramic materials or is in a green state as a mixture of ceramic forming materials.

Outer skin 15 has a perimeter that defines an outer surface 20 of the honeycomb structure 10. The outer surface 20 refers to the circumferential surface that extends longitudinally between end faces 14 and 16 of the honeycomb ceramic structure 10. For ease of discussion herein, the term circumferential (and/or circumference) is used, however, the honeycomb structure 10 can take shapes other than cylindrical (e.g., such as a polygonal prism) and the circumferential surface is intended to refer to the outer peripheral surface of any such shape.

In embodiments, honeycomb ceramic structure 10 is used to form a flow-through catalyst substrate or wall-flow filter and has, for example, between 100 to 900 cells per square inch (cpsi), which translates into a cell width that can range from between about 2.5 mm to about 0.85 mm. Walls 12 of honeycomb ceramic structure 10 can be any suitable thickness, such as on the order of 0.05-0.25 mm (approximately 2 mil to 10 mil) in thickness, or even 0.05-0.15 mm in thickness. However, the honeycomb ceramic structures 10 can have other geometries, e.g., depending on end use of the structure 10, such as few as approximately 50 cells per square inch, which translates into a cell width of about 3.6 mm. Other honeycomb bodies may have high cell densities, e.g., thousands of cells per square inch.

In embodiments, honeycomb ceramic structure 10 is used as a flow-through catalyst substrate that has cells 18 that are configured to be open or without plugging material between end faces 14 and 16. Cell density can be increased in order to correspondingly increase the area of contact between the automotive exhaust gases that flow directly through gas-conducting cells 18 and walls 12. To reduce the pressure drop that the flow-through catalyst imposes on the exhaust gasses, walls 12 can be made thin, e.g., approximately 0.05-0.25 mm in thickness, or 0.05-0.15 mm in thickness.

In embodiments, honeycomb ceramic structure 10 is used as a wall-flow filter, such as a gas particulate filter (GPF) or a diesel particulate filter (DPF) and the ends of some of the cells 18 at the inlet and outlet end faces 14 and 16 are plugged, for example, in a "checkerboard" pattern. This pattern forces the exhaust gases to pass through the porous walls 12 before exiting end face 16. For example, plug material is arranged in the cells 18 at the inlet face 14 in a checkerboard pattern and, additional plug material is arranged in the cells 18 at the outlet face 16 in a complementary checkerboard pattern such that the cells 18 that are plugged at inlet face 14 are open at outlet face 16 and the cells 18 that are open at inlet face 14 are plugged at outlet face 16. The density of cells 18 may be lower than for catalytic converters, e.g., typically between 100 and 400 cells per square inch. Further, walls 12 may be thicker, e.g., approximately 0.1-0.4 mm in thickness, for example. Whether honeycomb ceramic structures 10 are used as catalytic carriers or particulate filters, the outer skin 15 can be at least as thick as the walls 12, such as about three to five times as thick as walls 12.

The term "web" is used herein to refer to physical segments of the intersecting walls 12 that span one or more adjacent cells 18. The intersecting walls 12 can be envisioned as extending substantially with respect to a plurality of parallel and perpendicular planes, which thus define the repeating square pattern of the cells 18 shown in the FIGs. (although other non-square shapes can also be used). In the illustrated embodiments, the parallel and perpendicular planes extend along the axial direction A1, and also with respect to either a first transverse direction T1 or a second transverse direction T2, which transverse directions T1, T2 extend transversely across the faces of the honeycomb structure 10. However, due at least in part to the small dimensions of the walls 12 and cells 18, and to the manufacturing tolerances in creation of the honeycomb structure 10, the actual geometry of the walls 12 will not be perfectly planar (e.g., discussed further with respect to FIG. 11B below). Accordingly, the term "web plane" as used herein refers to the actual geometry of a continuous web of the walls 12 that continuously spans transversely across the honeycomb structure 10 (e.g., generally in the direction T1 or T2) with opposite ends terminating at the outer periphery at the skin 15 (i.e., akin to a mathematical chord) and also continuously spans in the axial direction A1 between opposite faces 14 and 16.

For example, FIG. 1 illustrates eleven web planes extending in the first transverse direction T1 (one of which is designated with reference symbol 'WP') and eleven web planes extending in the second transverse direction T2, although the honeycomb structure 10 can comprise any number of web planes, including dozens of web planes, hundreds of web planes, or even thousands of web planes. The web plane identified with symbol 'WP' in the illustrated embodiment of FIG. 1 extends a length of approximately eight of the cells 18 between opposite end points at the skin 15, although the web planes can extend any number of the cells 18 in length, e.g., depending on the shape, size, and number of intersecting web planes of the honeycomb body 10 in other embodiments. While an "ideal" honeycomb structure may have walls that are arranged precisely in the aforementioned parallel and perpendicular planes, it is reiterated that the "web planes", as this term is used herein, refers to the actual geometry of the walls 12 of the honeycomb structure 10 and are thereby each web plane is not expected to fall in, or be restricted to, a single two-dimensional plane. For this reason, the web planes may deviate from a single plane both in the transverse direction across the face of the honeycomb structure 10 (e.g., the direction T1 or T2) and in the axial direction (direction A1) between end faces 14, 16.

Honeycomb structures 10 can be manufactured by extruding or otherwise shaping a plasticized ceramic-forming precursor mixture, e.g., precursors of cordierite, mullite, silicon carbide or aluminum titanate, through an extrusion die. In embodiments, the ceramic-forming material includes inorganics (e.g., alumina, silica, etc.), binders (e.g., methylcellulose), pore formers (e.g., starch, graphite, resins), a liquid vehicle (e.g., water), sintering aids, or any other suitable additives. The extruded "green body" is then cut and dried. Such green bodies may be quite fragile, and are transported to a kiln, where the resultant heat transforms the relatively soft and fragile green body into a hardened, fired porous ceramic honeycomb structure.

During the manufacturing process, structural deviations, variations, or irregularities can occur in honeycomb structure 10. Such structural deviations, variations, or irregularities include, for example, conditions of the intersecting walls of the honeycomb structure and various conditions with the plugs in the cells. Conventional systems and methods are not able to correctly determine the location of each of the cell walls and plugs in the image (i.e., surface determination). For example, surface determination may not be able to accurately detect internal defects that occur at locations internally within the honeycomb body spaced axially away from the end faces. Such surface determination requires segmentation between part and background. Due to the variation in contrast and intensity across honeycomb structures, surface determination may be problematic for conventional systems and methods. Conventional systems and methods may require manually guided analysis by a skilled operator. The systems and methods disclosed herein are arranged to detect whether any anomalies or irregularities are present in and/or on the walls 12 at the end faces 14 and 16 or anywhere in between the end faces 14 and 16 along axis A1. The systems and methods disclosed herein are also arranged to detect whether any anomalies or irregularities are present in the plug material of the structure either in the end faces 14, 16 or in the plug material along axis A1 a distance from end faces 14, 16. The systems and methods disclosed herein are also arranged to detect whether any anomalies or irregularities are present in the pattern of the plug material in the structure 10. While certain anomalies or irregularities are merely aesthetic, others can cause the honeycomb structure to fail inspection or other undesirable effects. The systems and methods disclosed herein are capable of providing definitive identification of a variety of structural conditions within the honeycomb structure and can be used for effective process feedback and optimization without having to destroy the product to visually inspect the internal structure. The systems and methods disclosed herein allow fully automated analysis of structural conditions of the internal web planes and plugs, e.g., without manual intervention.

In embodiments where honeycomb structure 10 is used as a wall-flow filter, such as, a gas particulate filter (GPF) or a diesel particulate filter (DPF), the walls 12 act as filtration membranes. The exhaust which can enter the open cells 18 at the inlet face 14 is prevented from exiting directly through the exit cells by plugs in the ends of those cells 18. The plugs force the exhaust gas to pass through the porous cell membranes 12 into the exit cells that are open at the outlet face 16. The pore structure of the cell membranes 12 are designed to act as a filter, trapping particulate matter and preventing the particles from exiting the filter with the exhaust gas. Irregularities in these cell walls, such as breaks, tears, or cracks, can allow particulate matter to pass through the filter by bypassing the porous wall structure. These irregularities can be grouped into different categories based on their characteristics and on the process conditions that can cause them.

The categories of physical conditions in the cell walls include, for example, non-knits, thin-webs, inclusions, pin holes, tears, and cracks as further explained below. Additionally, the physical condition of the walls can be that the walls are free of irregularities. Non-knits are gaps in the wall that extend a significant portion of the axial length of the filter, such as the full length of the filter, and can be caused by the extruded ceramic precursor material not knitting together properly as it passes through the extrusion die. Thin-webs are regions of the wall, generally located between center-posts, in which the extruded material density is significantly lower than that of the surrounding area. These thin-web regions can lead to other physical conditions including tears in both green and fired parts.

Inclusions are particles of foreign material that become embedded in the ceramic precursor material during manufacturing. These particles, which can be made of metal, typically burn up, or melt, during subsequent firing steps resulting in holes in the wall. Pin holes are openings in the ceramic walls that are typically formed during the burnout of inclusion material during firing. These openings are larger than the typical pore structure and can result in reduced filtration efficiency.

Tears are gaps in the web plane, e.g., formed by material flow problems during extrusion. Typical causes are associated with material properties (e.g., viscosity non-uniformity) in the ceramic precursor batch material. Cracks are regions of the wall that crack or break during the firing process. Cracks can occur across multiple walls. Cracks can further be classified into the following sub-categories: dome cracks, bullet cracks, side cracks, camel cracks, firing cracks, and axial cracks.

Detectable structural conditions with the plugs in the cells can be related to a proper plug pattern. Extra plugged cells can reduce the available filter capacity and increase engine back pressure. Missing plugs can result in leaks of unfiltered exhaust, reducing the filtration efficiency of the product. Detectable structural conditions with the plugs in the cells can also be related to plug length. Plugs that are longer than nominal can reduce filtration capacity and increase engine back pressure. Plugs that are shorter than nominal can fail in use, e.g., be dislodged from the filter or pushed out of the channel, resulting in leaks of unfiltered exhaust and reduced filtration efficiency. The effective plug length is the length of continuous plug material not having any voids or cavities associated with the area. The effective plug length can be defined in numerous ways as well as with numerous starting locations from the face of the part.

Plug dimples are concavities that are visible in the face of the plug material and extend down into the plug along the length of the part. If the dimples extend too far into the plug along axis A1, they can compromise the plug integrity. Plug voids are unfilled holes internal to the plug material. Plug voids are not visible from the face of the part. Voids can also compromise the plug integrity.

In addition to the structural conditions with the walls and the plugs described above, while not affecting filtration efficiency of the filter products, variation in shape of the part (either the overall shape or details of the internal web structure) (i.e., geometric distortions) can affect other important characteristics of the product, such as, isostatic strength. Subtle geometric distortion in a structure 10, which can be caused by periodic fluctuations in the flow of material in the extruder, can be difficult to detect at a local level. Examining how the structure 10 varies over different length intervals can highlight these distortions making them easier to detect. For example, viewing a larger area can reveal subtle changes. In embodiments, the differential analysis techniques disclosed herein are used to examine how the structure 10 varies over different length intervals.

Before finished filters are installed in a vehicle, for some applications they are coated with a metal catalyst so the product can perform both filtration and catalytic modification of exhaust gases. The distribution of the metal washcoating in the filter can impact performance in a number of ways, including the efficiency of the catalysis and the back pressure that the filter generates in the exhaust system. It is important to be able to deduce whether such performance variation is the result of a nonuniformity in the metal washcoating or is a result of geometric variations in the original substrate.

The systems and methods disclosed herein are capable of providing definitive identification of a variety of structural conditions, including the identification of condition type, condition location, a number of instances of the condition, and/or a size of the condition within the honeycomb structure and can be used for effective process feedback and optimization without having to destroy the product to visually inspect the internal structure.

Figure 4:
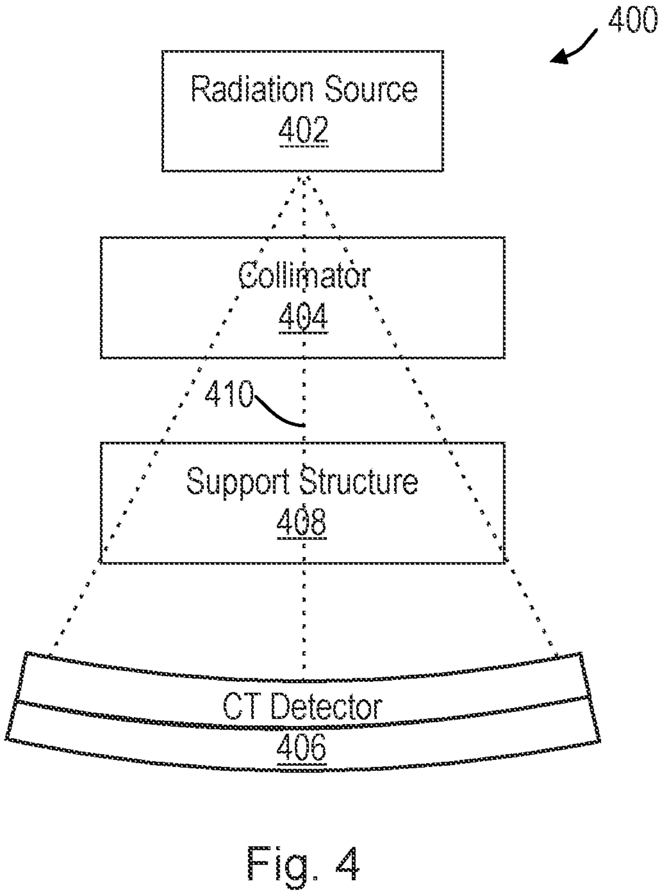
FIG. 4 is a block diagram of an exemplary system for non-destructive inspection of a honeycomb ceramic structure, according to aspects of the present disclosure.

Referring to FIG. 4, a block diagram of an example apparatus 400 for inspecting a honeycomb structure 10 is provided. Apparatus 400 can be embodied as a Phoenix V|tome|x C 450 3D CT Scanner or a Phoenix V|tome|x L 450 3D CT Scanner, both manufactured and sold by Waygate Technologies of Cincinnati, OH, for example. Apparatus 400 comprises a radiation source 402, for example, an X-ray head, a slice collimator 404, and a computed tomography (CT) detector 406, for example, an X-ray CT detector. The honeycomb structure 10 is mounted on a support structure 408 which can be rotatable in some embodiments, and not rotatable in other embodiments. The honeycomb structure 10 can be mounted in a substantially upright orientation or a substantially lateral orientation. Regardless of whether the honeycomb structure 10 is oriented substantially upright or substantially lateral, structure 10 is arranged at an angle relative to axis of irradiation 410 from radiation source 402. In embodiments, support structure 408 of apparatus 400 comprises rollers arranged at an angle to support the honeycomb structure 10 or any other suitable structure. The systems and methods disclosed herein advantageously allow the structure 10 to be imaged without the supporting material to be imaged. In embodiments, the support structure 408 is used as a reference plane for identifying the location of the face of the structure 10. The support structure 408 can be rotated in the presence of X-rays produced by radiation source 402 or the radiation source 402 and detector 406 can rotate together around the structure 10 mounted on support structure 408 in a helical pattern. The helical path of the rotating X-ray beam generates a three-dimensional data set, which can then be reconstructed into sequential images for a stack.

The three-dimensional data sets (i.e., CT data sets) being analyzed as described herein represent honeycomb structure 10 which is a three-dimensional object. It can be difficult to analyze such three-dimensional objects for internal attributes, particularly for honeycomb structures having a large number of long, thin channels as described herein. The systems and methods disclosed herein are capable of simplifying the task of analyzing the honeycomb structure 10 for various attributes by tracking the two-dimensional structures that are internal to the structure 10 through the part. The systems and methods disclosed herein are capable of scanning honeycomb structure 10 in a short time to continuously collect data at a plurality of cross-sections along the length of the structure 10. Orienting the honeycomb structure 10 during scanning such that the central axis A1 of honeycomb structure 10 is not orthogonal to the axis of irradiation 410 of radiation source 402 reduces noise and increases contrast.

Radiation source 402 can be embodied as an X-ray tube or a distributed source. A distributed radiation source emits X-rays from different locations along a surface. In embodiments, source 402 comprises one or more addressable solid-state emitters. Radiation source 402 is controlled by its own controller in embodiments. In such embodiments, the X-ray controller provides power and timing signals to the source 402. Slice collimator 404 is positioned proximate to radiation source 402. Embodiments of collimator 404 comprise collimating regions, such as lead or tungsten shutters, for each emission point of radiation source 402. Collimator 404 is configured to define the size and shape of the beams of radiation that pass into an area in which a honeycomb structure 10 is positioned. A beam of radiation can be generally fan-shaped or cone-shaped, depending on the configuration of the detector array and the method of data acquisition. An attenuated portion of radiation passes through a honeycomb structure 10, which provides the attenuation, during scanning and impacts detector 406.

Radiation source 402 is controlled by a system controller which furnishes power, focal spot location, control signals, etc. Detector 406 is coupled to the system controller and comprises readout electronics. The same system controller is used to control the radiation source 402 and the detector 406 in embodiments. In other embodiments, different system controllers are used to control the radiation source 402 and the detector 406. In embodiments, detector 406 converts sampled analog signals to digital signals and transmits the digital signals to a processor for further processing. In other embodiments, detector 406 transmits the sampled analog signals to a processor and the processor converts the analog signals to digital signals. The system controller is configured to acquire the analog or digital signals generated in detector 406. In embodiments, the system controller is configured to comprise signal processing circuitry and associated memory circuitry. The associated memory circuitry can store programs and instructions executed by the controller. The memory stores configuration parameters, image data, etc. In embodiments, the system controller can be part of a processor-based system, such as, an application-specific computer system.

In embodiments, an application-specific computer is coupled to the one or more system controllers. Data collected from the detector 406 is calibrated and processed by a system controller and/or an application-specific computer. In embodiments, the computer is configured to produce representations of line integrals of attenuated coefficients of the scanned honeycomb structure. The computer comprises a memory to store processed data, data to be processed, or modules or instructions to be executed for processing image data. It should be appreciated that any suitable memory is contemplated. In embodiments, the application-specific computer is configured to control scanning operations and data acquisition. In embodiments, the computer is configured to receive parameters for controlling scanning operations and data acquisition from an operator via a keyboard and/or other suitable input devices associated with a separate workstation system.

The system further comprises a display and/or a printer in embodiments. In some embodiments, the display and/or the printer is coupled to the computer described herein. In other embodiments, the display and/or the printer is coupled to a separate workstation system, which in turn is connected to the computer described herein.

In embodiments where the radiation source 402 and detector 406 can rotate together around the structure 10 mounted on support structure 408 in a helical pattern, the one or more system controllers are configured to control a positioning system. The positioning system is configured to control the rotation of the radiation source 402 and/or the detector 406. In embodiments, the collimator 404 is rotated with the radiation source 402 and the detector 406. The radiation source 402, collimator 404, and detector 406 is rotated through one or more turns around support structure 408 on which honeycomb structure 10 is mounted.

Figure 5:
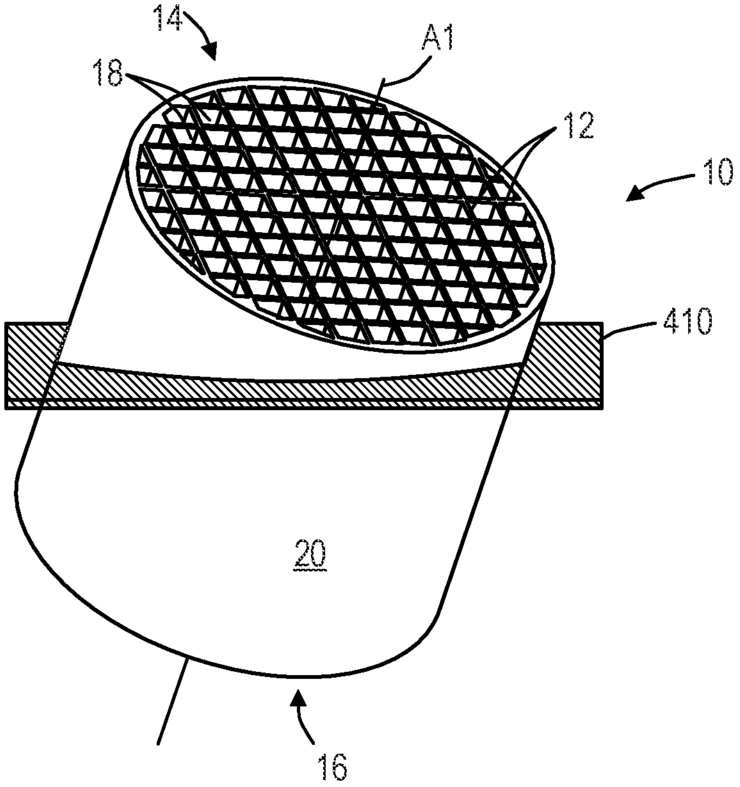
FIG. 5 shows an exemplary orientation of a three-dimensional volume file of a honeycomb ceramic structure during scanning, according to aspects of the present disclosure.

FIG. 5 shows an exemplary orientation of a three-dimensional volume file of a honeycomb structure 10 during scanning such that the central axis A1 of honeycomb structure 10 is not orthogonal to the axis of irradiation 410 of radiation source 402. The horizontal slices taken through the part by apparatus 400 during scanning are not parallel to either end face 14, end face 16, or central axis A1.

Figure 6:
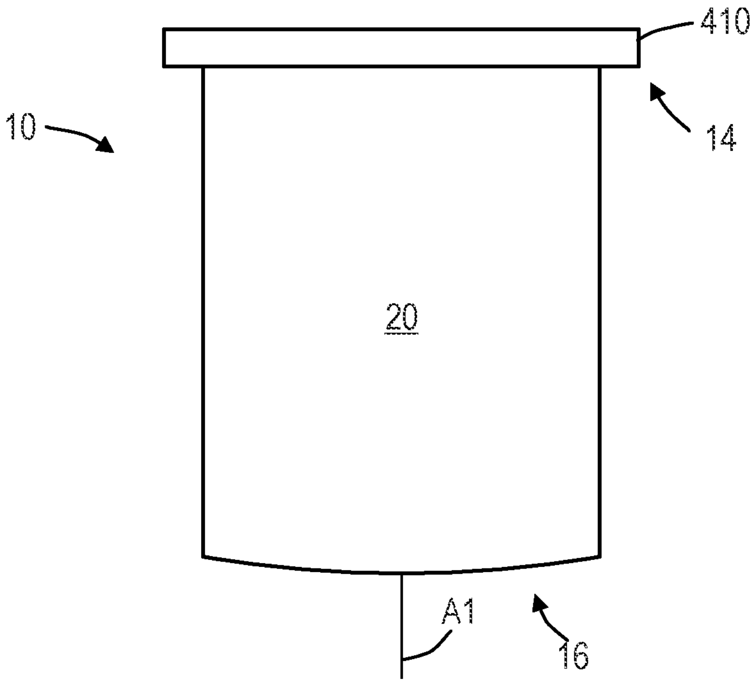
FIG. 6 shows an exemplary orientation of a three-dimensional volume file of a honeycomb ceramic structure after scanning and registration, according to aspects of the present disclosure.
Figure 8:
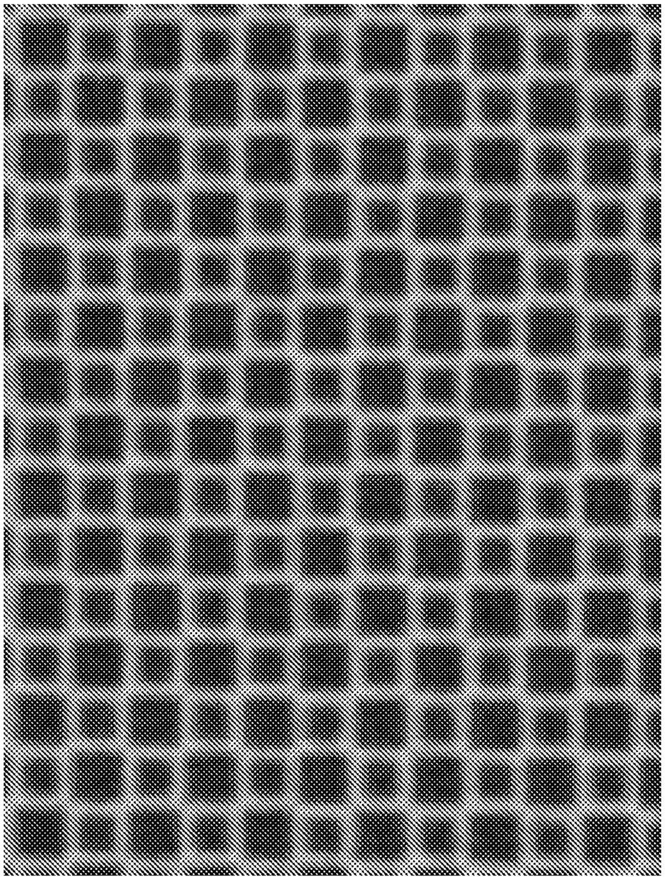
FIG. 8 shows a close up view of the walls of FIG. 7 after registration, according to aspects of the present disclosure.
Figure 7:
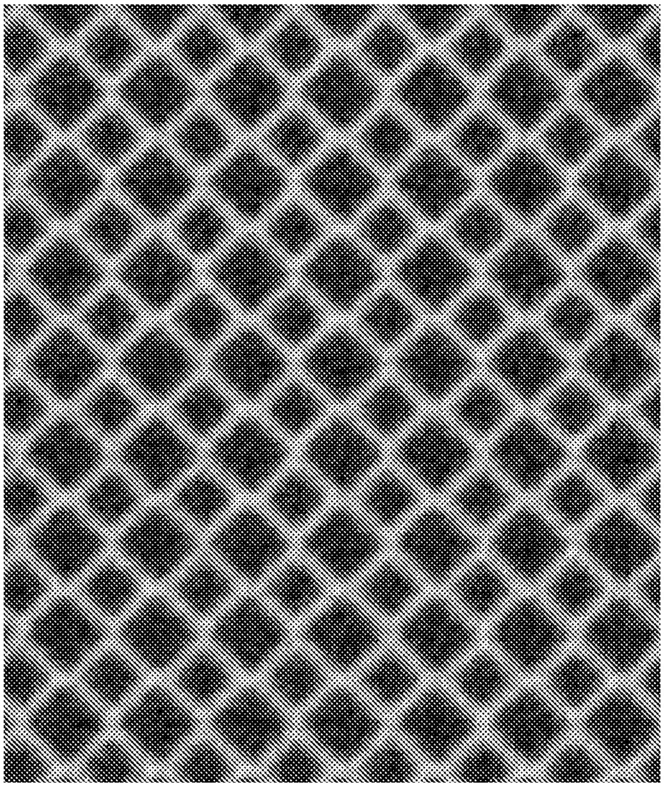
FIG. 7 shows a close up view of walls of a honeycomb ceramic structure after scanning, according to aspects of the present disclosure.

Prior to analyzing the three-dimensional volume file generated by apparatus 400, the three-dimensional volume file is rotated to align the honeycomb structure 10 with an analysis axis, i.e., the axis of irradiation 410. This alignment is described as part of a registration process. FIG. 6 shows an exemplary orientation of a honeycomb structure 10 after scanning and registration. To further illustrate the registration process, FIG. 7 shows a close up image generated by apparatus 400 during scanning. The image shown in FIG. 7 shows webs of honeycomb structure 10 oriented at approximately 45 degrees. The web angle is dependent on how the part is loaded on support structure 408 of apparatus 400 for scanning. FIG. 8 shows a close up image generated by apparatus 400 after rotating the volume image file during registration. In contrast to the webs shown in FIG. 7 which are shown oriented at approximately 45 degrees, the webs shown in FIG. 8 are oriented orthogonal to the volume axes. In embodiments, the honeycomb structure 10 has non-uniform cell sizes as shown in FIG. 8.

Figure 10:
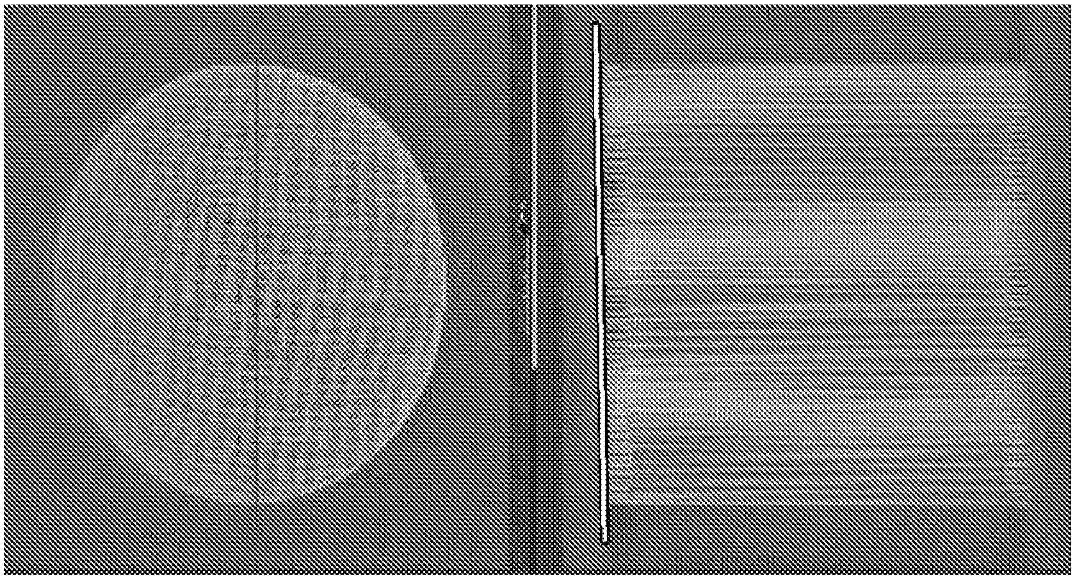
FIG. 10 shows an end view and its corresponding side view of a honeycomb ceramic structure generated after registration, according to aspects of the present disclosure.
Figure 9:
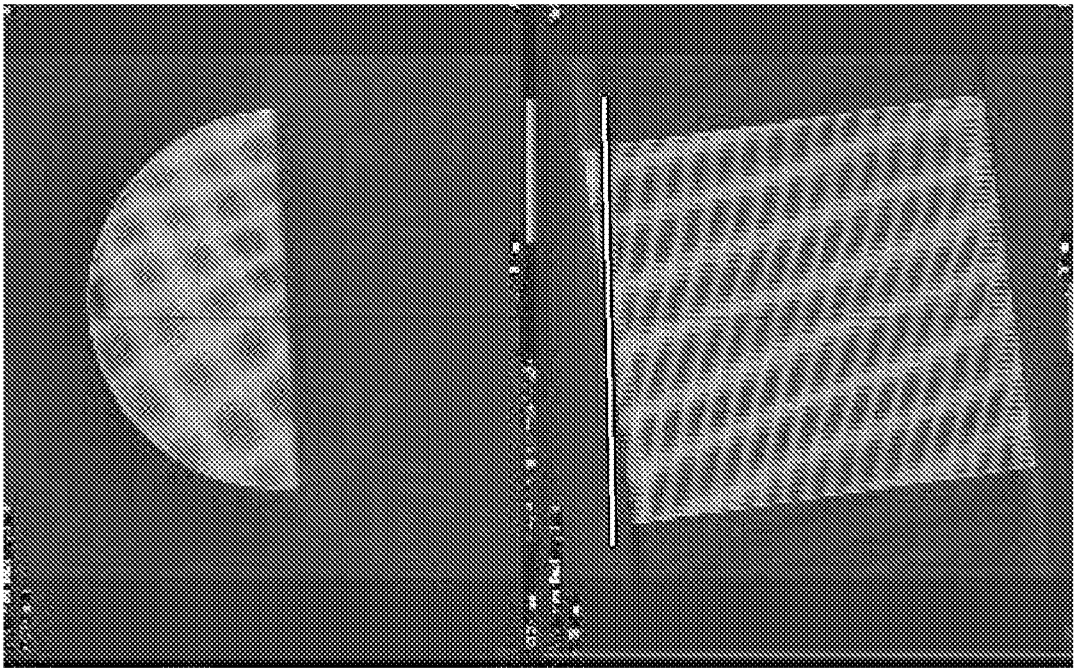
FIG. 9 shows an end view and its corresponding side view of a honeycomb ceramic structure generated during scanning, according to aspects of the present disclosure.

FIG. 9 shows images generated by apparatus 400 during scanning. FIG. 10 shows images generated by apparatus 400 after registration. The following should be appreciated in view of FIGS. 9 and 10. The image in the top of FIG. 9 shows a horizontal plane of a three-dimensional volume file obtained during scanning. The horizontal plane captured in the image in the top of FIG. 9 portrays only part of a honeycomb structure 10 because the structure 10 is tilted. The part of the top of the honeycomb structure 10 that is below the axis of irradiation is not shown in the image in the top of FIG. 9. The image in the bottom of FIG. 9 shows a side view of a three-dimensional volume file obtained during scanning. The side view captured in the bottom of FIG. 9 shows the angle at which the honeycomb structure 10 is tilted during scanning. The side view also shows that the top of the honeycomb structure 10 is not orthogonal to the volume axes.

The image in the top of FIG. 10 shows a horizontal plane of a three-dimensional volume file just touching the top of a honeycomb structure 10. The entirety of the top of the honeycomb structure 10 is visible because the three-dimensional volume file has been rotated during registration. The image in the bottom of FIG. 10 shows a side view of a three-dimensional volume file after registration. As shown in the side view, the honeycomb structure 10 is oriented orthogonally relative to the volume axes after registration.

Once the three-dimensional volume file is rotated to align the honeycomb structure 10 with the analysis axis, the three-dimensional volume file can be analyzed as described below. In embodiments, apparatus 400 comprises the algorithms disclosed herein. In other embodiments, a separate image processing system, independent of apparatus 400, comprises the algorithms disclosed herein. The separate image processing system can be communicatively coupled to apparatus 400. Specifically, two-dimensional-based image analysis techniques are used to analyze the three-dimensional material density data sets generated by the CT system. The three-dimensional material density data sets can also be referred to as three-dimensional volume data herein. As described herein, the three-dimensional volume data or file is reduced to two-dimensional data sets. Regions of interest are identified in the two-dimensional data sets of the three-dimensional volume file, a two-dimensional manifold for each of the regions of interest from the three-dimensional volume file is extracted, and a structural condition of the honeycomb structure is identified based on the two-dimensional manifolds.

Each image of a plurality of images in the three-dimensional volume file can be analyzed to identify the web planes of the honeycomb structure. Since the web planes are essentially two-dimensional, the systems and methods disclosed herein are capable of extracting these internal two-dimensional structures from the three-dimensional CT data thereby reducing the complexity of the image analysis and enabling faster analysis and the use of a wider range of two-dimensional image processing algorithms. Additionally or alternatively, each image of the images in the three-dimensional volume file can be analyzed to identify plugged and unplugged cells defined by cellular walls of the honeycomb structure. The cells can also be treated as essentially two-dimensional structures. Thus, the systems and methods disclosed herein are capable of extracting two-dimensional images of the cells to reduce the complexity of the image analysis and enable faster analysis and the use of a wider range of two-dimensional image processing algorithms.

In practice, web planes are not perfectly straight, thus, they do not fall along straight cut planes. Since the honeycomb ceramic structures can be extruded with a variable fine scale of contortion to the structure (i.e., twisting, curvature, or bowing of the channel walls), it can be particularly challenging to identify attributes quickly and efficiently with minimal contrast variations over a given part length. In digital form, the cell wall can move location as the wall is followed down the same pixel image location. Thus, the images of the three-dimensional volume file are oriented so that the walls are horizontal and vertical as described above with reference to FIGS. 7 and 8.

In embodiments of the systems and methods described herein, a "flattened" representation of the walls 12 is constructed to assist in analysis, which may be referred to as a planar representation, and which may be embodied as a two-dimensional image. That is, while each of the walls 12 generally extends with respect to a plane, such as a plane 1102 shown in FIG. 11B, the walls 12 themselves do not actually fall exactly along their respective plane due to slight variations in the geometry of the walls caused during manufacture. For example, the walls 12, and therefore the corresponding channels 18, may be slightly angled, bowed, twisted, wavy, and/or fluctuate in thickness, as shown exaggeratedly in the enlarged view of FIG. 11B. Accordingly, in some embodiments a "flattened" or planar representation the walls 12 is constructed by generating a geometric contour corresponding to the actual geometry of the walls 12 and then, for each "web plane" of the walls 12, projecting intensity data from the 3D volume file in accordance with the geometric contour into a single planar representation corresponding to that web plane. In this way, the geometric contour enables a conformable manifold to be built from the three-dimensional volume file that follows the actual geometry of the walls 12. By projecting the intensity data corresponding to the manifold onto a plane, the web planes WP of the honeycomb structure 10 (which are not in actuality planar) can be converted into a two-dimensional representation, i.e., the aforementioned planar representation (e.g., as a two-dimensional image, such as in FIG. 13A).

In some embodiments, identifying the web planes of the honeycomb structure comprises detecting a center line (with respect to a thickness of the walls 12, i.e., a thickness-wise centerline) of each web plane in the structure 10. In some embodiments, the three-dimensional volume file can be reduced into a plurality of two-dimensional data sets (e.g., images), such as described with respect to FIG. 12 below. Each web plane can be identified per two-dimensional data set (e.g., each two-dimensional data set corresponds to a cross-sectional slice, such as from 10 to 100 microns along the axial direction A1 of the honeycomb body 10, in one embodiment), such as by using one or more of the highest intensity pixels for all pixels in the horizontal direction and then the vertical direction, tracing the walls side-to-side and top and bottom. This can be done to generate a geometric contour portion for each cross-sectional slice and then a geometric contour for the entire web plane can be generated for each web plane by combining together the geometric contour portions from each of the slices. Once the geometric contour is generated for a given web plane, intensity data can be extracted from the three-dimensional volume file in accordance with the geometric contour in order to represent the actual geometry of that web plane (which is not perfectly planar) as a planar representation, such as a two-dimensional image. Creating and analyzing a single image (the planar representation) per each web plane is advantageous as it simplifies and speeds up the task of identifying and tracking the physical or structural conditions described herein. For example, the current inventors have surprisingly found that analysis of standard honeycomb bodies with commercially available CT-scanning and analysis systems can take several days or even over a week to analyze, while the same honeycomb body can be analyzed in accordance with the currently disclosed systems and methods in a matter of minutes.

In some embodiments, the geometric contour is generated by representing a thickness-wise centerline of the walls 12 along each web plane as a series of line segments. Since the actual geometry of the walls 12 does not perfectly follow a single plane, the angles of the line segments may deviate from each other, thereby more accurately following the actual geometry of the walls 12. By extracting intensity data from the 3D volume file in accordance with the geometric contour, a manifold (or surface) conforming to the actual geometry of the honeycomb structure 10 can be obtained. For example, this extracted intensity data can be projected onto a single plane to represent the walls 12 along each web plane as if "flattened" onto the single plane for each web plane, thereby creating a two-dimensional or planar representation of the actual geometry. Once arranged as a planar representation, the intensity data can be stored and/or displayed, for example, as a two-dimensional image (e.g., with the pixels of the image corresponding to the intensity of the data extracted from the three-dimensional volume file). The geometric contours (e.g., series of line segments) can be displayed in one or more different colors to facilitate visualization. In embodiments, one or more geometric contours are displayed in a single color, yet in different lightness, hue, or both to differentiate between intersecting web planes. Each geometric contour follows a different individual web plane across the honeycomb structure 10.

Figure 11A:
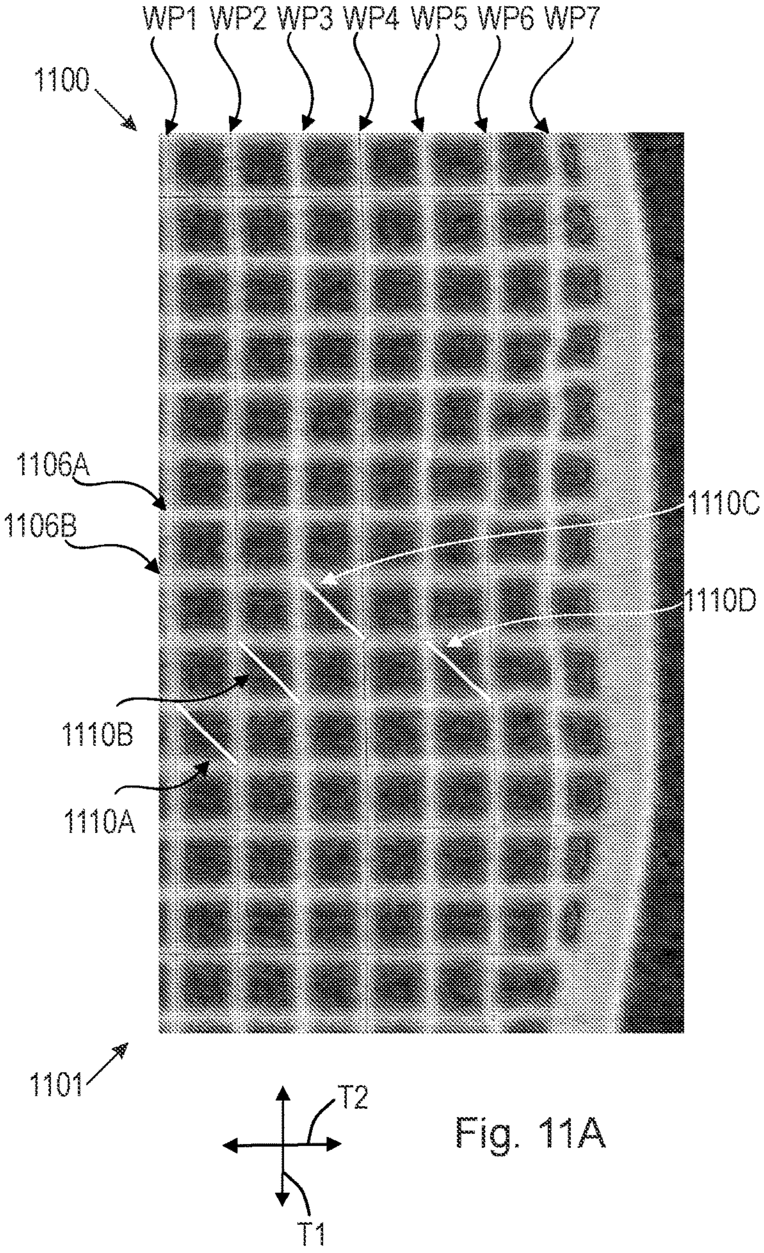
FIG. 11A shows a close up view of part of a slice image of a three-dimensional volume file, according to aspects of the present disclosure.

FIG. 11A shows a part of an image of a three-dimensional volume file over which geometric contours have been overlaid, which track, represent, or approximate the actual geometry of the walls 12 along each web plane as described herein (seven web planes designated as WP1-WP7 shown in FIG. 11A). A portion of a geometric contour 1104 is shown as one example in FIG. 11B described further below. For example, the geometric contours can be generated to approximate or represent one or more features or dimensions of the walls 12, such as a thickness-wise centerline that extends along the walls 12 of each of the web planes WP as shown in FIGS. 11A-11B.

Along the top of FIG. 11A, there are seven visible web planes WP1, WP2, WP3, WP4, WP5, WP6, and WP7 extending between end 1100 and end 1101 of the image (generally with respect to the first transverse direction T1). For ease of discussion, these web planes may be referred to as "vertical" due to their orientation when viewed. In FIG. 11A, there are more deviations present in vertical web planes WP6 and WP7 than the other vertical web planes WP1, WP2, WP3, WP4, and WP5 (e.g., nonuniformly sized and shaped cells, and bent or wavy walls can be seen). Although not discussed in detail, FIG. 11A also illustrates additional horizontal web planes intersecting the vertical web planes WP1, WP2, WP3, WP4, WP5, WP6, and WP7 (extending generally with respect to the second transverse direction T2). Each of the additional perpendicular (e.g., "horizontal") web planes intersect web planes WP1, WP2, WP3, WP4, WP5, WP6, and WP7 at corner post regions as discussed herein.

Figure 11B:
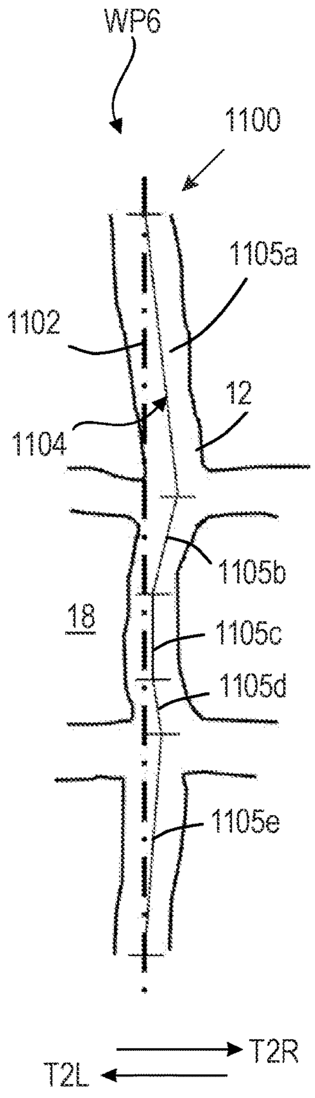
FIG. 11B shows an enlarged view of a dimensionally exaggerated portion of one of the web planes of FIG. 11A.

FIG. 11B schematically illustrates an enlarged view of a portion of the wall 12 of the web plane WP6 starting at the end 1100 of FIG. 11A. However, the geometric variations (deviations from the plane 1102) in FIG. 11B have been exaggerated (dimensions not to scale) for ease of illustration and discussion. Also for ease of discussion in FIG. 11B, the transverse direction T2 is shown in single-directional components T2R (pointing toward the right-hand side with respect to the orientation of FIG. 11B) and T2L (pointing toward the left-hand side with respect to the orientation of FIG. 11B). Thus, the direction T2 generally encompasses both of the single-direction components T2R and T2L together.

In some embodiments, each of the line segments is formed on, along, or with respect to a thickness-wise center line of the walls 12. In embodiments, the intensity of the pixels making up the image are sampled along the web planes (e.g., generally in the transverse directions T1 and/or T2) to determine where the thickness-wise center of the cellular wall is located (e.g., as shown in FIG. 11A, the material of the walls 12 is a lighter color, corresponding to a higher intensity value, than the emptiness in the cells 18). The center can also be identified based on a highest intensity pixel at each location along the length of the walls 12. Deviation from the center can be determined in any desired way. For example, in some embodiments the geometric contours are created by finding one or more center points as described above, and then using one or more boundary tracing, contour tracing, and/or line simplification or approximation algorithms, such as the Ramer-Douglas-Peucker algorithm, radial sweep algorithm, or others.

For example, referring to FIG. 11B, a geometric contour 1104 comprising a series line segments starts from a starting point at the thickness-wise center (e.g., using pixel intensity values as described herein) of the wall 12 at the first side 1100. For example, in the illustrated embodiment, the geometry contour comprises a first line segment 1105*a*, a second line segment 1105*b*, and so on for line segments 1105*a*-1105*e*. The geometric line contour 1104 can comprise any number of line segments, e.g., depending on the length of the web plane being represented by the line contour 1104 and the degree to which the web plane deviates along its length. Each of the line segments in the series making up the geometric contour can be drawn as a straight line until the line segment deviates more than a predetermined amount from the determined centerline of the wall 12. Each successive or subsequent line segment can start at the end point of the preceding line segment. In this way, each successive line segment can be drawn from the end of the preceding line segment until the geometric contour 1104 spans the entire length of the given web plane as a series of line segments. For example, line segments 1105*a*, 1105*b*, 1105*c*, 1105*d*, and 1105*e* are shown in FIG. 11B, but any number of line segments can be included in the series 1104 when taken in full along the entire length of the web plane. This process can be repeated for each web plane 12 in the honeycomb structure 10 (e.g., a separate geometric contour can be created for each of the web planes WP1-WP7, and also for every other web plane in the honeycomb body 10).

As shown in FIG. 11B, first line segment 1105*a* extends at a small angle relative to the plane 1102 from the beginning of the segment to the end of the segment. The term "beginning" is used to refer to the end of web plane WP6 at end 1100 of the image. The end of segment 1105*a* is positioned slightly more to the right than the beginning of segment 1105*a*. The term "end" is used to refer to the end of the segment that is opposite the beginning. As described above, deviations in the centerline of the cellular wall of web planes can be detected, e.g., based on the pixel intensity sampling techniques. In embodiments, once such a deviation is detected, first line segment 1105*a* is terminated. The systems and methods disclosed herein then determine the second line segment 1105*b* starting at the end of first line segment 1105*a*. In embodiments, the first line segment 1105*a* is terminated only after a deviation is detected that surpasses a predetermined threshold value. Thus, deviations that are detected that are equal to or less than the predetermined threshold value do not cause the segment to be terminated. Thus, in those embodiments, deviations that are less than the predetermined threshold value do not cause the segment to be terminated.

In some embodiments, the line segments can be so that they are each one-pixel in length by forming the geometric contour as the center point at each pixel location traveling down the length of the web plane (traveling in the direction T1) in a pixel-by-pixel manner. In other words, the geometric contour can be created having a maximum number of points equal to the number of pixels along the length of the feature of interest, in this case the number of pixels in the first transverse direction T1 in which the walls 12 of the web plane WP6 extend. To reduce computational complexity, the line segments can alternatively be drawn using one or more boundary tracing, contour tracing, and/or line simplification or approximation algorithms, such as the Ramer-Douglas-Peucker algorithm, radial sweep algorithm, or others.

In FIG. 11B, like first line segment 1105*a*, second line segment 1105*b* extends at a small angle, relative to the plane, from the beginning of the segment to the end of the segment. The end of second line segment 1104 is positioned slightly more to the left than the beginning of segment 1104. The angle of the first line segment 1105*a* differs from the angle of the second line segment 1105*b*. Thus, while first line segment 1102 angles from top to bottom in direction T2R, second line segment 1105*b* is angled from top to bottom in direction T2L. It should be appreciated that other line segments can be arranged at different angles, and that some segments can even fall along, or be parallel to, the plane 1102 (such as segment 1105*c*).

The use of multiple line segments to form the geometric contour 1104 advantageously accounts for the aforementioned geometric deviations of the cellular wall of web plane WP6, and thereby approximates or represents the actual geometry of the web plane WP6. Similar geometric contours can be drawn to approximate or represent the actual geometry of each web plane or other feature of interest in the honeycomb body 10. For example, with respect to the plane 1102, the center of the cellular wall at the beginning of first line segment 1105*a* can be offset from the center of the cellular wall at the end of the first line segment 1105*a*, and the offset can be equal to or greater than the predetermined threshold value. In other words, the geometry of the wall is such that at least a portion of the wall is misaligned with respect to the plane 1102, such that the center of the wall is not consistently on the plane 1102. So as to reasonably limit the number of line segments in the series forming the geometric contour 1104 (thereby reducing total computational power required for "flattening" and analysis), the actual, or calculated, center of the cellular wall can deviate between the beginning and end of each line segment as long as such deviations are less than the predetermined threshold value. It should also be appreciated that although the length of first line segments 1105*a* is substantially equivalent in FIG. 11B to the length of a single web between corner posts, the line segments in the series 1104 do not have to be of a substantially similar length. The length of each line segment depends on where a deviation is detected relative to an immediately previous line segment. For example, if no deviations are detected, a single line segment can be used to trace along a length of multiple cells 18, or even an entire web plane. Alternatively, multiple line segments can be drawn for a single cell, such as line segments 1105*b*, 1105*c*, and 1105*d* together equaling approximately the length of a single cell in FIG. 11B.

In this way, first line segment 1105*a*, second line segment 1105*b*, third line segment 1105*c*, and so on for all line segments in the series that forms the geometric contour 1104 follows the actual geometry of the web plane WP6 as it meanders. FIG. 11B only shows a portion of the web plane WP6, so additional line segments in the series can be determined along web plane WP6. This process is then repeated to create a geometric contour (e.g., series of line segments) for each of the other vertical and horizontal web planes in FIG. 11A.

Figure 12:
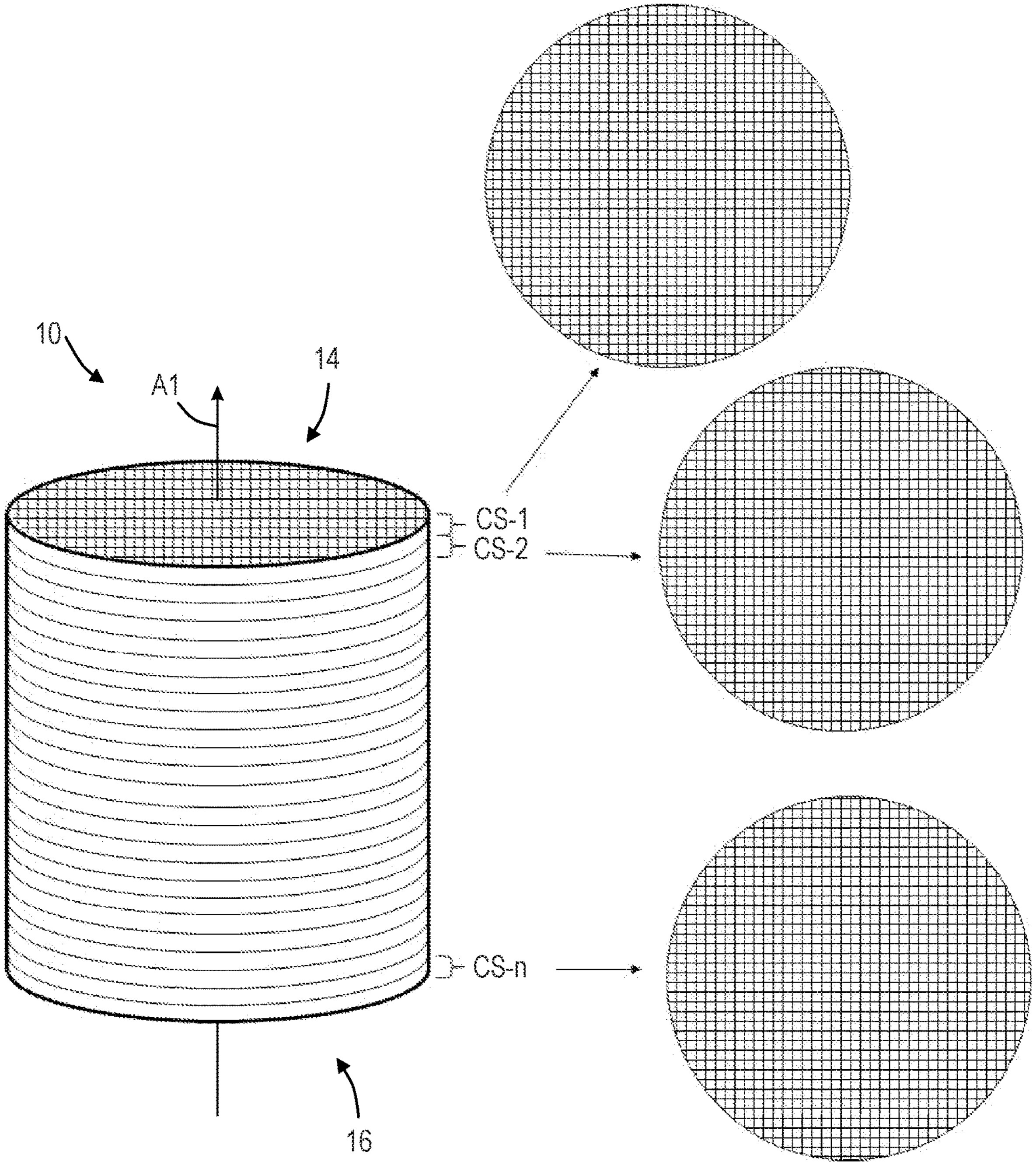
FIG. 12 schematically illustrates a three-dimensional volume of a honeycomb structural divided into a plurality of cross-sectional slices, which can be useful to reduce the three-dimensional volume into a plurality of two-dimensional data sets according to aspects of the present disclosure.

Since each of the web planes may deviate significantly along the entire axial length of the honeycomb structure 10 between the end faces 14 and 16, the geometric contours in some embodiments are created from a plurality of geometric contour portions of a corresponding plurality of cross-sectional slices of the honeycomb body 10. For example, as shown in FIG. 12, the honeycomb structure 10 can first be divided into a plurality of cross-sectional slices CS taken sequentially along the axial direction A1. Any number of the cross-sectional slices CS can be made, with cross-sectional slices CS-1, CS-2, and CS-n labeled in FIG. 12, with slice CS-1 representing a first slice at the end face 14 and slice CS-n corresponding to a final slice at the opposite face 16, for a total of 'n' slices along the axial length of the honeycomb body 10. The above-described process of generating geometric contours as disclosed herein can be repeated for each of the horizontal and vertical web planes in each cross-sectional slice CS through the part, from top to bottom. Accordingly, the geometric contour 1104 in FIG. 11B can be the geometric contour of the web plane WP6 in only a single one of the cross-sectional slices CS. Geometric contours of a feature of interest (e.g., a web plane) for only a single cross-sectional slice may be referred to herein as geometric contour portions. In this way, the full geometric contour for the entirety of each web plane can be formed by combining together a plurality of geometric contour portions, where each geometric contour portion corresponds to the localized geometric contour of each web plane in each cross-sectional slice.

In some embodiments, the thickness of each cross-sectional slice is from 10 μm to 200 μm, such as about 100 μm along the axial length of the honeycomb body 10 (with respect to the axial direction A1). In some embodiments, the cross-sectional slices CS are generated, stored, displayed, and/or represented by projecting the intensity data from the three-dimensional volume file corresponding to each cross-sectional slice onto a single cross-sectional plane (three such projections shown in FIG. 12 for the slices CS-1, CS-2, and CS-n).

For example, in accordance with the above, in embodiments where the honeycomb structure 10 is scanned with a 100 micron per voxel resolution, the intensity values taken from the volume slice (cross-sectional slices CS) along the axial length of the honeycomb structure 10 are used to represent the material density along the web plane in each such 100 micron slice of the part.

Figure 13A:
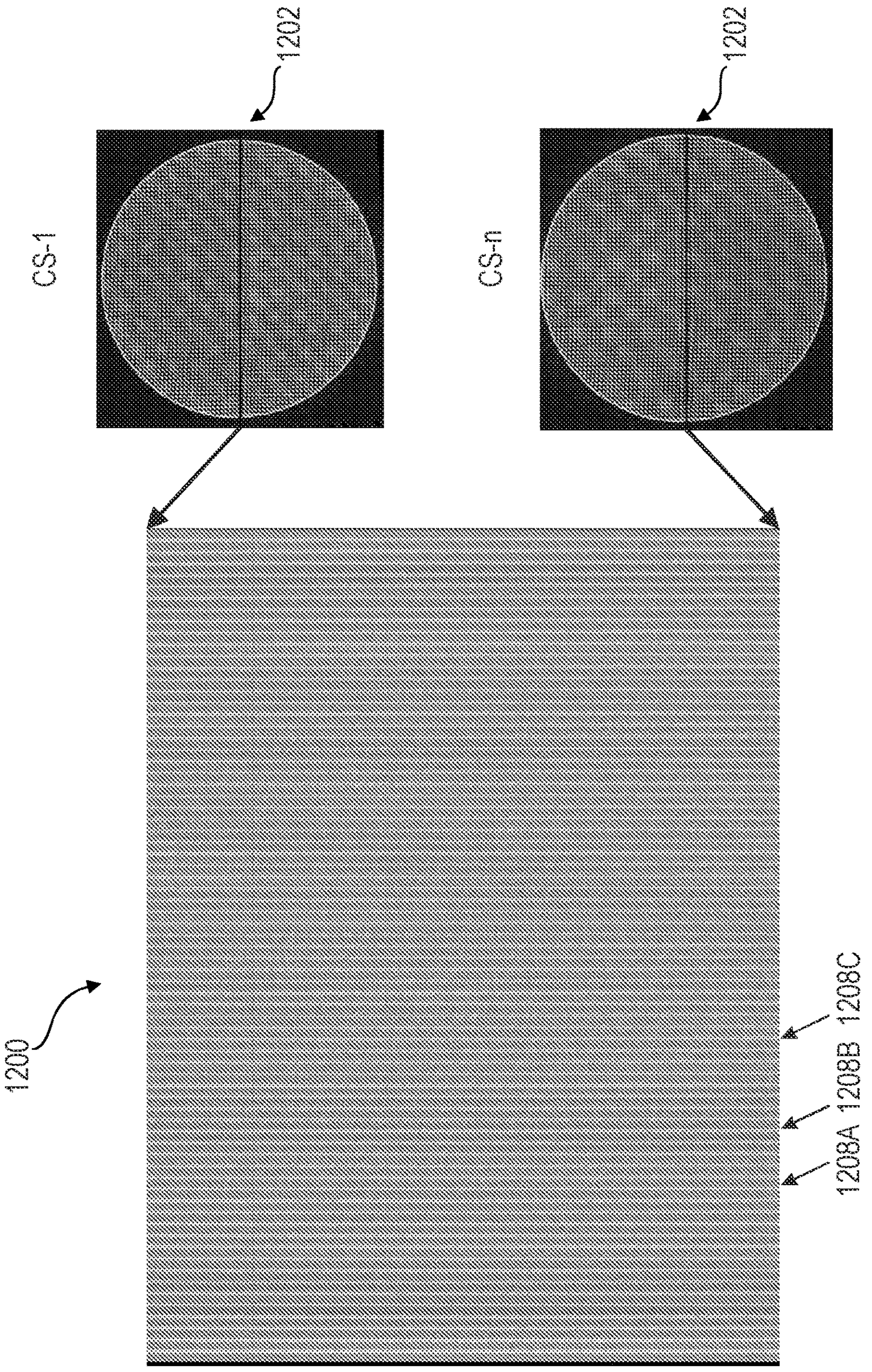
FIG. 13A shows a view of a two-dimensional image (planar representation) of a web plane from data extracted from a three-dimensional volume file, according to aspects of the present disclosure.

Intensity values can be extracted from the three-dimensional volume file in accordance with the geometric contour, such as from the geometric contour portions for each successive slice that are stacked together, to generate a planar representation of the material density over the entire web plane along axis A1. For example, as shown in FIG. 13A, intensity values from each cross-sectional slice CS can be used to create one line in planar representation of the actual geometry of the web plane, shown in FIG. 12 as a web plane image 1200. For example, the web plane image 1200 (planar representation) in FIG. 13A is created from the geometric contour for the centermost web of the honeycomb structure 10. In this way, the intensity values extracted for center web 1202 in first slice CS-1 generate the first line in web plane image 1200 and the intensity values for this same center web 1202 in final slice CS-n generate the last line in web plane image 1200, with intensity values from slices CS located between first slice CS-1 and final slice CS-n are used to generate the lines in web plane image 1200 between the first and last lines in the planar representation. First slice CS-1 can be taken of end face 14 when honeycomb structure 10 is oriented as shown in FIG. 6 after registration, and final slice CS-n can be taken of end face 16. A planar representation, such as web plane image 1200, is generated for each web plane within structure 10. The intensity values used for each web plane image 1200 can be those extracted from the three-dimensional volume file and projected as discussed with respect to FIGS. 11A and 11B.

Figure 13C:
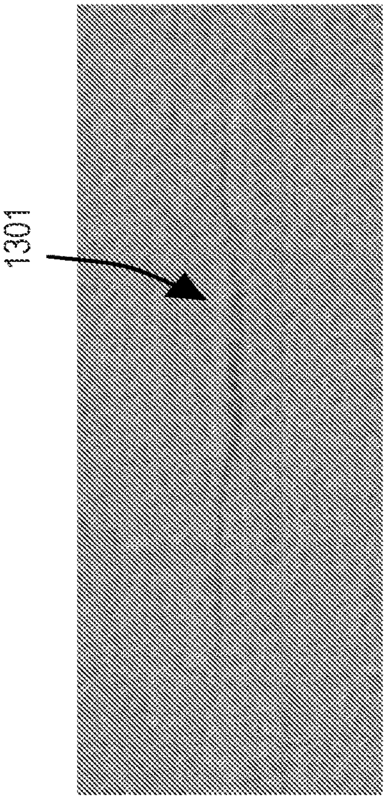
FIG. 13C shows an enlarged view of an example of an irregularity that can be detected as a comparatively darker area (lower intensity values) in a two-dimensional image (planar representation) of a web plane, according to aspects of the present disclosure.
Figure 13D:
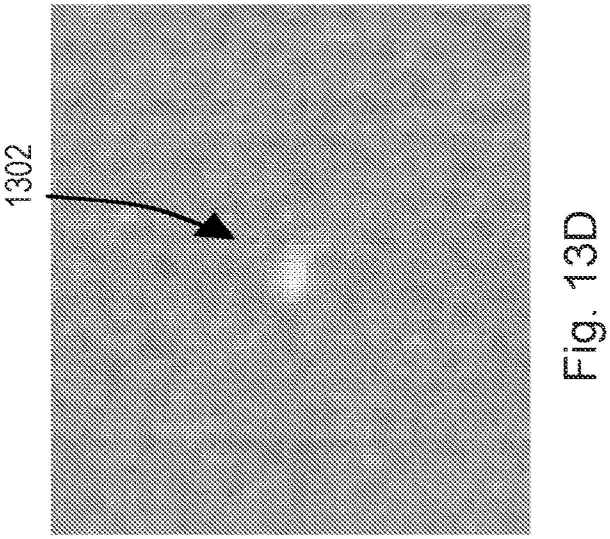
FIG. 13D shows an enlarged view of an example of an irregularity that can be detected as a comparatively brighter or lighter area (higher intensity values) in a two-dimensional image (planar representation) of a web plane, according to aspects of the present disclosure.
Figure 13B:
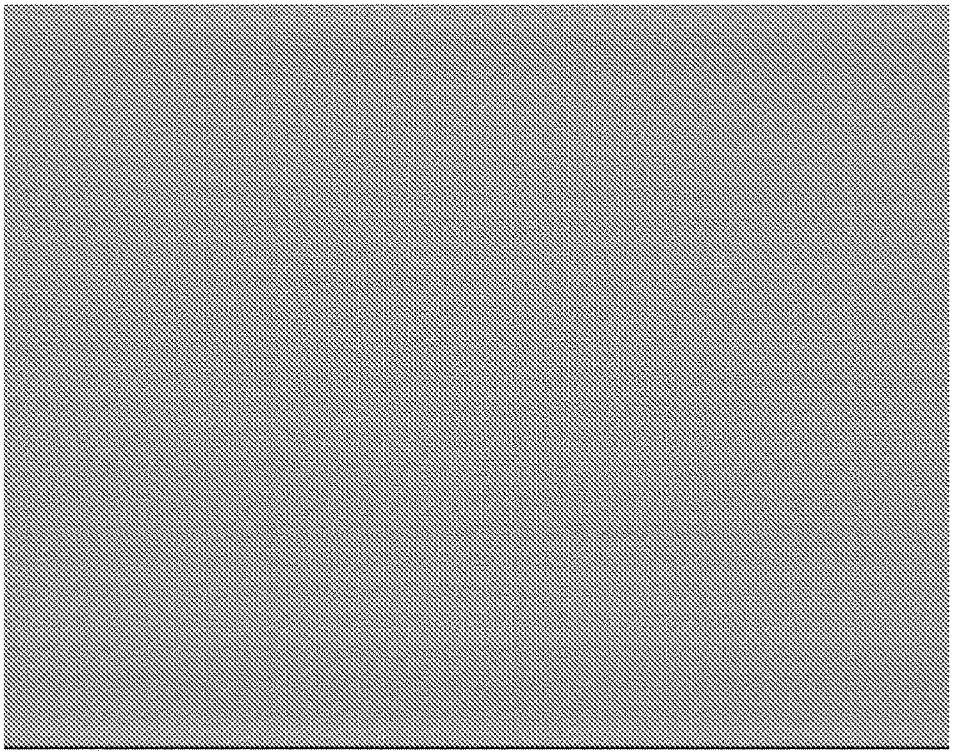
FIG. 13B shows a view of the two-dimensional image (planar representation) of FIG. 13A after removal of regularly reoccurring stripes of relatively higher intensity data corresponding to higher density wall intersections, according to aspects of the present disclosure.

After the planar representations are generated, each planar representation can be analyzed for a variety of structural conditions. In embodiments, the analyses comprise filtering techniques to remove apparent periodic material density variations from the 3D volume data related to the regular cell spacing in the honeycomb structure 10. As shown in FIG. 13A, vertical stripes 1208A, 1208B, 1208C, and so on, are visible artifacts caused by higher density material in the corner post regions of the structure 10. Corner post regions 19A and 19B are shown in FIG. 3. Additional corner post regions 1106A and 1106B are shown in FIG. 11A. The corner post regions are located at the intersection of the horizontal and vertical walls of structure 10. Since these regions are slightly thicker, the X-rays used to generate the three-dimensional volume file are absorbed more in this region thereby creating bright (high intensity) pixels in these areas. The bright pixels can make it difficult to identify subtle level changes in these areas. In embodiments, such artifacts are removed using Fast Fourier Transform (FFT) filtering techniques. Removal of such artifacts can enhance visualization of subtle contrast variations in the underlying web plane. Examples of planar representations, in the form of web plane images, after removal of the vertical stripes 1208A, 1208B, and so on, are shown for an entire web plane in FIG. 13B and enlarged portions of web planes in FIGS. 13C and 13D. Separating out these regularly occurring variations in brightness in the images can enhance the visualization of desired attributes for counting and/or measurement of structural conditions of the internal webs. For example, FIG. 13B shows an irregularity-free web plane in which there is a generally uniform intensity value (represented by color/brightness) across the entire web (and thus no irregularities are detected). In contrast, FIG. 13C illustrates an enlarged portion of a web plane in which an irregularity can be determined from an area 1301 of non-uniform intensity (for example, the darkened intensity data at the area 1301 may represent an area of comparatively lower density, such as a gap, crack, or tear). As another example, FIG. 13D illustrated an enlarged portion of a web plane in which an irregularity can be determined from an area 1302 of non-uniform intensity (for example, the lighter intensity data at the area 1302 may represent an area of comparatively higher density, such as debris or a contaminant).

Additionally or alternatively, there can be reconstruction artifacts in the X-ray image that appear as increased contrast-to-noise ratio areas and can cause inconsistencies in the detection of the plugging area or the cell wall to air interface. In embodiments, the systems and methods disclosed herein are configured to determine or obtain a functional range of brightness allowing discrimination of certain attributes of interest. In embodiments, the systems and methods are configured to determine or obtain a global threshold value of brightness per scan and suppress one or more noisy areas to increase the signal-to-noise ratio. In embodiments where at least one noisy area has a brightness value that is less than the global threshold value of brightness, such noisy area can be suppressed to increase the signal-to-noise ratio. Removing such variations in the images that stem from the CT scan operation makes it easier to visualize the variations that are inherent to honeycomb structures 10.

Additionally or alternatively, the presence of noise in the reconstructed X-ray images can make it challenging to detect subtle attributes. In embodiments, the systems and methods disclosed herein exploit a predetermined characteristic of the honeycomb structure 10 to measure and subtract X-ray noise. For example, a ratio of cell openings to web thickness (i.e., cell wall thickness) is determined and/or obtained and the ratio is used to measure and subtract X-ray noise resulting in improved signal-to-noise ratios. In embodiments, the predetermined characteristic pertains to the fact that a large portion of the internal volume of the honeycomb structure 10 is empty. The exploited predetermined characteristic describe the emptiness of structure 10 and is used to measure the degree of X-ray noise in the image. The measured degree of X-ray noise in the image is compensated for using the techniques described herein and any other suitable alternatives. Subtracting X-ray noise can improve the visualization of the honeycomb structure 10 and allows improved part analysis.

Using the systems and methods disclosed herein, a variety of structural conditions of the walls can be detected quickly, accurately, and automatically. For example, the systems and methods disclosed herein can be configured to detect openings in the walls that are typically formed during burnout of inclusion material during firing. These openings can be larger than the typical pore structure of the walls and can cause reduced filtration efficiency. Without the noise reduction and contrast enhancement techniques described herein, it can be difficult to visualize the presence of pinholes.

Additionally or alternatively, the systems and methods disclosed herein can be configured to detect regions of the wall that are located between web center-posts, such as, corner post regions 19A and 19B (in FIG. 3) and regions 1106A and 1106B (in FIG. 11A), in which the extruded material density is significantly lower than that of the surrounding area. As described herein, corner post regions are located at the intersection of the horizontal and vertical walls of the structure 10. The regions located between web center-posts are easier to visualize when the artifacts caused by the higher density material are filtered out as described herein. Regions located between web center-posts that have an extruded material density that is significantly lower than that of the surrounding area (i.e., thin-web regions) can lead to other physical conditions including tears in both green and fired parts. In embodiments, an average of the extruded material density of the regions located between web center-posts is calculated and any regions or sub-regions that have an extruded material density that is less than the average by at least a predetermined threshold amount are identified.

In embodiments where the systems and methods disclosed herein are applied to green parts, detected tears can indicate that there are issues with the batch material. Tears can be caused by the batch material tearing as it is extruded. Thus, detecting tears in green parts can help determine that the batch material is too dry, for example, quicker than would be determined using other conventional inspection systems and methods.

In embodiments where the systems and methods disclosed herein are applied to fired parts, detected cracks can indicate that there are issues with temperature non-uniformity in the kiln. Cracks can be formed during firing and may be related to temperature non-uniformity in the kiln. Thus, detecting cracks in fired parts can help determine whether there is a temperature non-uniformity in the kiln, for example, quicker than would be determined using other conventional inspection systems and methods. Cracks can be easier to visualize when the artifacts caused by the higher density material of the web center posts are filtered out as described herein.

In some embodiments, detection of one of more irregularities (e.g., cracking, tearing) is used to generate a signal to alter the manufacturing process, e.g., via processors 1804 of system 1800 discussed in more detail below. For example, if tearing or non-knitting of green parts is detected, which indicates that the batch material may be too dry, a signal can be generated to automatically adjust a water injection system to provide additional water into the extruder barrel during subsequent extrusion. As another example, if cracking is detected in fired parts, the signal can be used to automatically adjust the firing cycle, such as by lowering temperature, implementing longer holds, or reducing ramp rates. In some embodiments, detection of one or more irregularities (e.g., tearing, cracking, etc.) is used to generate a signal that creates an audio and/or visual indicator related to the irregularity, such as the type of irregularity, prevalence or severity of the irregularity (e.g., number of parts affected, number of irregularities detected, size of irregularity), or an area or location in a manufacturing facility or manufacturing asset in which the irregularity is occurring. For example, if tearing or non-knitting is detected, the signal can instruct a display (e.g., a computer monitor) to display information related to the detected irregularity or a loudspeaker to audibly announce information or sound a warning. As another example, if cracking is detected as a result of firing, a signal can be generated to display (such as via a map of the kiln displayed on a computer monitor) an area of the kiln in which the cracked honeycomb body or bodies were located. In this way, subsequent manufacturing can be improved by either automatic adjustment or conveyance of information (e.g., audio/visual) to assist technicians in troubleshooting manufacturing issues.

In embodiments, the systems and methods disclosed herein can be configured to display a top view of the honeycomb structure 10 with locations of wall conditions indicated in the display of the top view. For example, one type of visual indicator of one or more colors can be used to indicate cracks and another type of visual indicator of one or more colors can be used to indicate tears. The type and/or shape of the visual indicators for the cracks and tears can be the same or different. Similarly, the colors of the visual indicators can be the same or different. It should be appreciated that any visual indicators of any style are contemplated as long as the visual indicators are capable of differentiating between the types of structural conditions. In exemplary embodiments, yellow circles can indicate cracks and blue circles can indicate tears. In other embodiments, yellow circles can indicate cracks and yellow triangles can indicate tears. In other embodiments, yellow circles can indicate cracks and brighter yellow circles can indicates tears or vice versa. The display of locations of wall structural conditions can be embodied as an interactive map where each visual indicator, if selected via some input component, is associated with additional details on the selected structural condition. For example, the particular location and/or size of the condition can be displayed in a separate window alongside the interactive map or at least partially superimposed on the interactive map when a particular visual indicator is selected by a user.

The systems and methods disclosed herein can also be configured to inspect the web planes for coating, layer, or deposition characteristics, such as washcoat uniformity. For example, a metal washcoat can be applied to the structures 10 to provide catalysis of exhaust streams, filtration material can be deposited to assist in filtration efficiency, and other coatings, layers, and depositions can be applied for a variety of purposes. The same steps described herein for inspecting the physical condition of internal web planes can be used, but the web plane images can be inspected for the characteristics, such as thickness or uniformity, of coated regions. In embodiments, a washcoat or other materials are applied to the pores in the cell membranes or walls. In other embodiments, a washcoat or other materials are applied on the cell membranes or walls. In either embodiment, the systems and methods disclosed herein can be configured to detect overcoated regions of in-wall coatings or on-wall coatings.

The systems and methods disclosed herein can also be configured to detect subtle changes in part geometry along the axial length of the part using a differential analysis. Such subtle changes can relate to flow instabilities in the extruder. For example, two partial image slices are provided on the left side of FIG. 14. The partial image slices 1302 and 1304 can be taken through a honeycomb structure, such as 2 mm apart. The systems and methods disclosed herein can be configured to subtract the partial slice images taken at different axial planes. The regions where the geometry is not changing cancel out. In the regions where the geometry is changing, such changes can be highlighted as shown on the right side of FIG. 14.

As mentioned above, the systems and methods disclosed herein are capable of analyzing each image of the images in the three-dimensional volume file to identify plugged and unplugged cells defined by cellular walls of the honeycomb structure 10, in addition to or as an alternative to the analysis performed to identify the internal web planes described herein.

Identifying the plugged and unplugged cells defined by the cellular walls of the honeycomb structure 10 comprises determining, by apparatus 400, an image slice taken below the plugs and identifying the locations of the cellular walls and the regions between the cellular walls in the slice below the plugs. The regions between the cellular walls represent cell interiors. The part alignment, noise reduction, contrast enhancement, and web detection described herein with respect to identifying structural conditions of internal web planes can also be carried out to identify the plugged and unplugged cells. Like the web planes, the regions between the cellular walls are essentially two-dimensional; thus, the systems and methods disclosed herein are capable of extracting these internal two-dimensional structures from the three-dimensional CT data thereby reducing the complexity of the image analysis and enabling faster image analysis and the use of a wider range of two-dimensional image processing techniques.

While an image slice taken of a top of a honeycomb structure 10 can exhibit a checkerboard pattern where the plug material is present, an image slice taken a distance from the top of the honeycomb structure 10 can exhibit a modified checkerboard pattern (i.e., a pattern that is not uniformly distributed across the face of the part or otherwise different). The modifications in the checkerboard pattern can represent regions between the cellular walls that no longer have plug material. The depths of at least some of the plugs in a honeycomb structure 10 can be measured using this data.

Determining an image slice below the plugs comprises determining a first image slice that does not have any checkerboard pattern of plug material in embodiments. The image slice below the plugs is then analyzed as described herein to identify the locations of the walls and the cell interiors. The regions between the walls are the cell interiors. Instead of forming geometric contours along the web planes of the walls 12 as discussed above, geometric contours can be formed for other features of interest, such as plugs, and/or plugged and unplugged cells near the ends 14, 16 when the honeycomb structure 10 is arranged as a particulate filter. In these embodiments, the geometric segments can be formed as line segments extending across the interiors of the cells 18, such as through the plugs in the cell interiors. While the line segments used for plug inspection can be formed in directions parallel to the web planes, in some embodiments, the line segments used to create a geometric contour for plug inspection are formed diagonally across the cell between diagonally opposite corner posts. For example, diagonal line segments 1110A, 1110B, 1110C, and 1110D as shown in FIG. 11A, which are generated for each cell interior in an image slice below the plugs, can be used as geometric contours when the feature of interest comprises one or more plugs. Each cell interior is identified per image using pixel intensity data. Diagonals may be advantageous in some embodiments since they are approximately 40 percent larger than if taken as a parallel vertical or horizontal line across the cell interiors (e.g., between opposite webs instead of between diagonally opposite corner posts). This is done for each 10-100-micron slice of the part and a new image is generated per cell interior.

Figure 14:
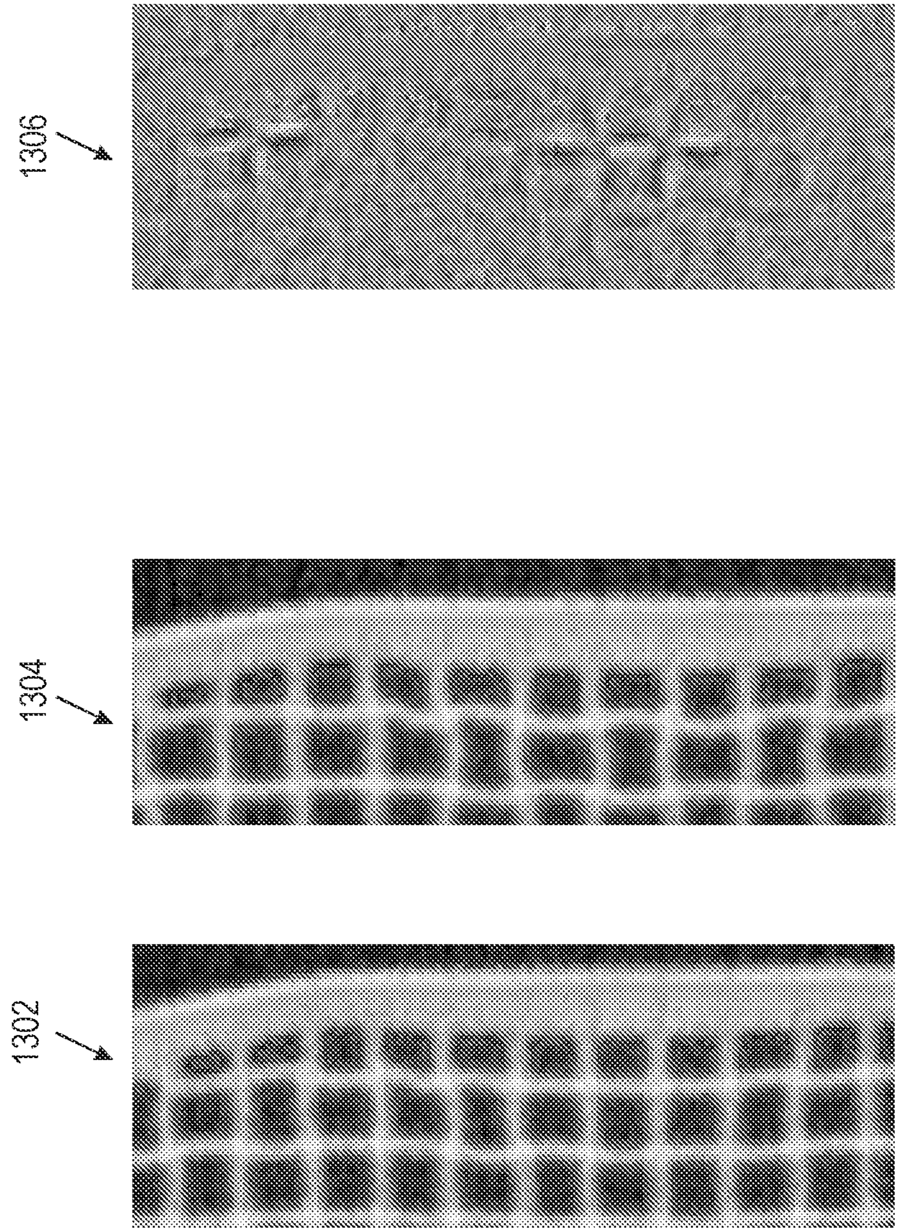
FIG. 14 shows close up views of parts of slice images of a three-dimensional volume file and a resulting image generated when the slice images are subtracted from each other using differential analysis techniques, according to aspects of the present disclosure.

Similar to the above discussion with respect to FIG. 12, intensity values corresponding to each image slice through the three-dimensional volume file can be stacked together to generate a planar representation, e.g., two-dimensional cross-sectional images 1400 and 1500 of the cell regions passing through plugs as shown in FIGS. 14 and 15. In embodiments, the intensity values taken from the three-dimensional volume along a plug are used to represent the material density of the plug material. Values extracted from the three-dimensional volume file corresponding to the geometric contour, such as the geometric contour portions from each successive slice stacked together, create a planar representation of the material density of the plug material over the entire plug along axis A1.

After a two-dimensional cross-sectional image of each cell is generated, each cross-sectional image 1400 and 1500 is analyzed to determine a variety of measurements relating to plug qualities. For example, outlines 1410 and 1510 of plugs are determined and identified as shown in FIGS. 14 and 15. Outlines 1410 and 1510 of plugs can be used to determine maximum depths or lengths of the plug material. Plugs that are longer than nominal can reduce filtration capacity and increase engine back pressure. Plugs that are shorter than nominal can fail in use, resulting in leaks of unfiltered exhaust and reduced filtration efficiency.

Figure 15B:
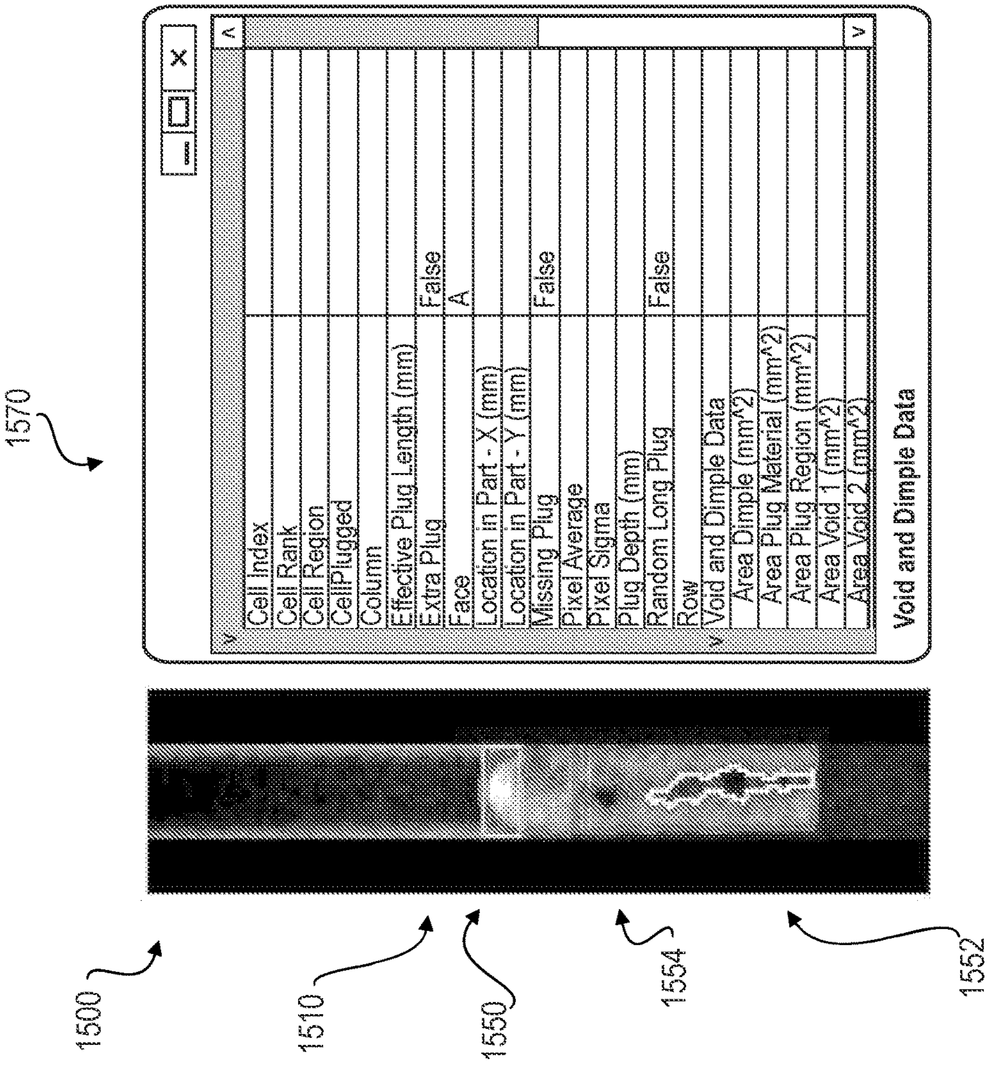
FIG. 15B shows a view of a two-dimensional cross-sectional image of a plugged cell extracted from a three-dimensional volume file, and an exemplary display of measurement data corresponding to the plugged cell generated by the systems and methods disclosed herein, according to aspects of the present disclosure.
Figure 15A:
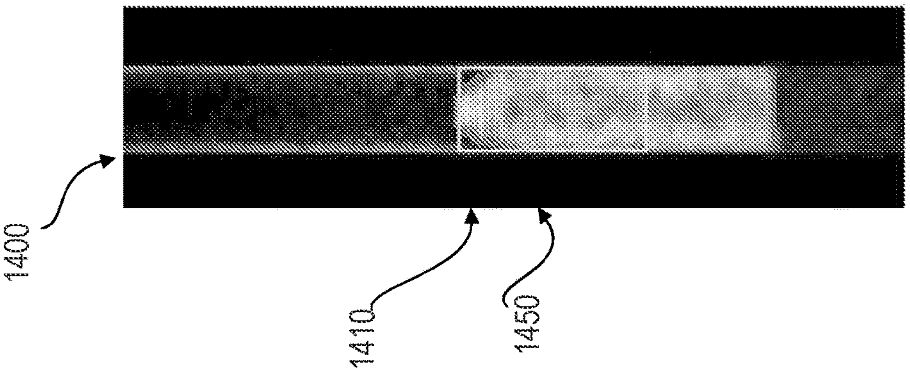
FIG. 15A shows a view of a two-dimensional cross-sectional image of a plugged cell extracted from a three-dimensional volume file, according to aspects of the present disclosure.

Effective plug regions 1450 and 1550 can also be determined as shown in FIGS. 15A and 15B. The effective plug length is the length of continuous plug material not having any voids or cavities (i.e., dimples) associated with the area. Region 1450 in FIG. 15A shows the effective plug length of the particular plug depicted. It should be appreciated that the effective plug length can be defined in numerous ways as well as with numerous starting locations from the face of the part. Region 1450 in FIG. 15A extends from the innermost edge of the plug within the part toward the part face (at the bottom). FIG. 15B also shows effective plug length region 1550. Region 1550 extends from the inner most edge of the plug within the part toward the part face (at the bottom). Region 1550 in FIG. 15B is much shorter than region 1450 shown in FIG. 15A. One reason region 1550 is shorter than region 1450 is because dimple region 1552 is determined to be present in the particular plug illustrated in FIG. 15B. Plug dimples are concavities that are visible in the face of the plug (at the bottom) and extend down into the plug along the length of the part. As shown in FIG. 15B, dimple region 1552 starts at the end face (at the bottom) and extends upward into the plug along the length of the part. If dimple region 1552 extends too far into the plug, the dimple region 1552 can compromise the integrity of the plug. Another reason region 1550 is shorter than region 1450 is because internal void 1554 is also determined to be present in the particular plug illustrated in FIG. 15B. Internal voids are unfilled holes within the plug material and can compromise the integrity of the plug. Since such voids are not visible from the face of the part, conventional inspection systems and methods may not be effective at identifying such voids.

As shown in FIG. 15B, the systems and methods disclosed herein can also comprise a means for visualizing a variety of measurements relating to plug qualities. An exemplary display can comprise, in addition to an image of a cross-section of a plug, an electronic display 1570 showing evaluated qualities and measurement results. The display 1570 can be embodied as an interactive chart including high level data that can be drilled down for additional detail.

Embodiments of the systems and methods disclosed herein can comprise a means for visualizing distribution and statistics of plug depth, effective plug depth, dimple depth, and void fraction across an end face of a honeycomb structure 10. In embodiments, the means for visualizing the distribution and statistics are color coded electronic displays. Exemplary electronic displays are fully interactive such that clicking or otherwise selecting on a cell region in a distribution map of the whole part causes an image of the selected cell region and/or plug (such as images 1400 and 1500 shown in FIGS. 15A and 15B) to appear alongside or at least partially overlapping the distribution map. Selection of a cell region and/or plug in the distribution map can also cause a window of one or more measurements relating to plug qualities (such as display 1570) to be displayed alongside or at least partially overlapping the distribution map. The image of the selected cell region and/or plug and the display of measurements can be side-by-side in the display. It should be appreciated that embodiments include a color coded means for visualizing plug depth distribution across end faces 14 and 16. The color coding can reveal patterns or periodic variations in the plug depths which can correspond with a spacing of holes in a plugger homogenizer plate. Providing color coded visualization of the spatial distribution of the measured data helps identify process and equipment drivers of product quality. It should be appreciated that embodiments of the systems and methods disclosed herein also comprise a means for visualizing cell density across the part face. Different colors can be used to indicate different levels of cells per square inch, for example.

Figure 16:
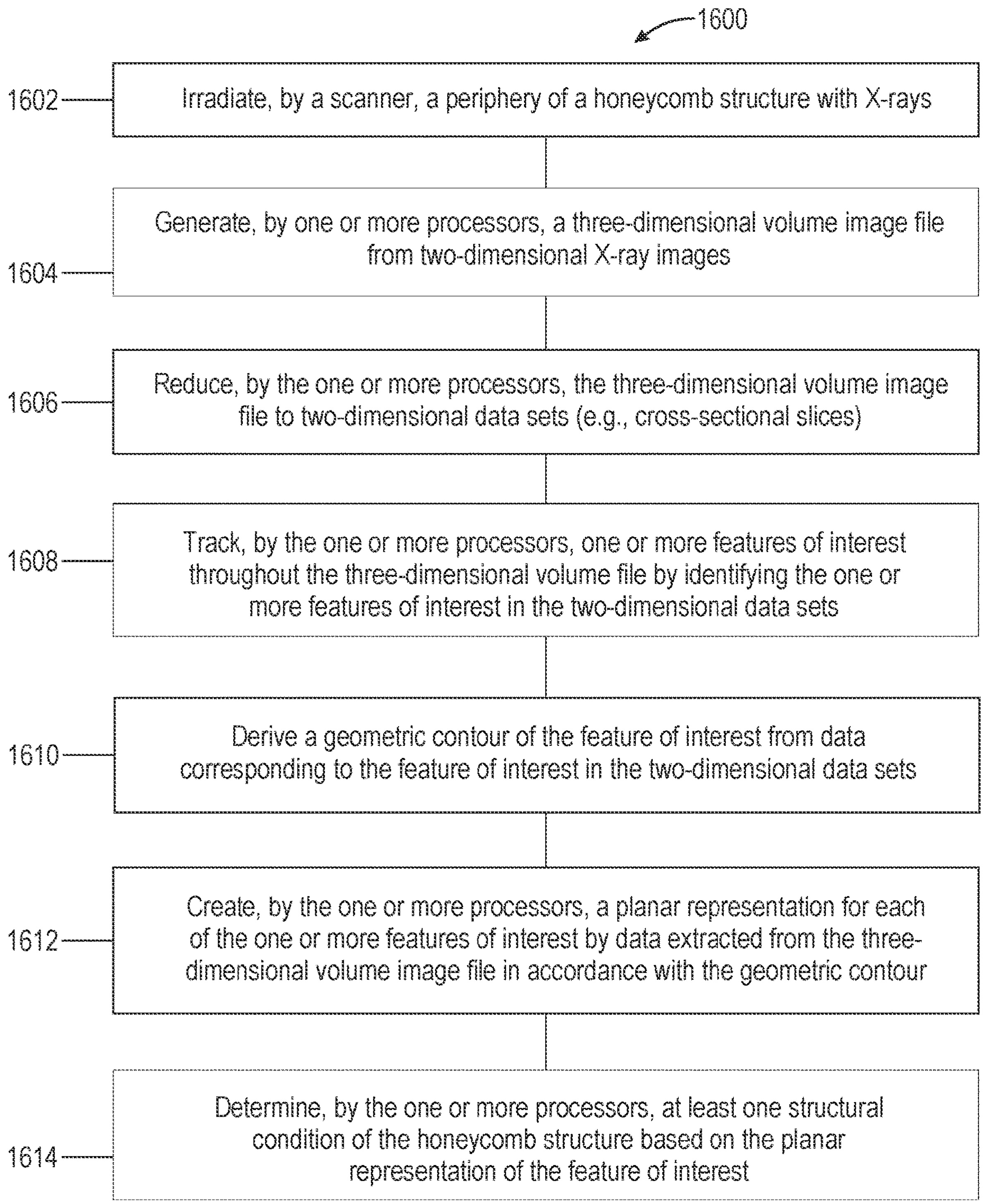
FIG. 16 depicts a flowchart of an example method of inspecting a honeycomb structure, according to aspects of the present disclosure.

Referring to FIG. 16, a flowchart 1600 of an example method of inspecting a honeycomb structure 10 is provided. Flowchart 1600 can be performed using any of the embodiments of apparatus 400. Further structural and/or operational embodiments will be apparent to persons skilled in the relevant art(s) based on the discussion regarding flowchart 1600.

The method of flowchart 1600 begins at step 1602. In step 1602, a periphery of a honeycomb structure is irradiated with X-rays by a scanner. At step 1604, a three-dimensional volume file is generated from the two-dimensional X-ray images from the scanner, e.g., using one or more processors. The steps 1602 and/or 1604 can be performed by any system suitably capable of generating a three-dimensional volume file of an object from x-ray images, such as a CT scanning system as described herein. In embodiments, the scanner is a Phoenix V|tome|x C 450 3D CT Scanner or a Phoenix V|tome|x L 450 3D CT Scanner, both manufactured and sold by Waygate Technologies of Cincinnati, OH, or any suitable alternative.

At step 1606, the three-dimensional volume file is reduced by one or more processors to two-dimensional data sets. For example, in some embodiments, the step 1606 comprises dividing the three-dimensional volume file into a plurality of cross-sectional slices (e.g., the cross-sectional slices CS described with respect to FIG. 12). In some embodiments, the cross-sectional slices are sequentially formed to have thickness that extend along the axial direction of the honeycomb structure in the three-dimensional volume file. In some embodiments, the two-dimensional data sets are formed by projecting intensity data from the three-dimensional volume file corresponding to each cross-sectional slice onto a single cross-sectional plane for each slice.

At step 1608, one or more structural features of interest are tracked through the three-dimensional volume file, e.g., by the one or more processors, by identifying the structural feature of interest in each of two-dimensional data sets. In some embodiments, the structural feature of interest is a web plane of the honeycomb structure. In some embodiments, the structural feature of interest is a plug, or the plugged and unplugged channels of the honeycomb structure when arranged as a filter. In some embodiments, the structural feature is a coating, layer, or deposited material, such as a washcoat or catalyst material. In some embodiments, the structural feature of interest is tracked throughout the three-dimensional volume file by locating the structural feature in each of the cross-sectional slices. For example, the structural feature of interest can be identified by its relative position in adjacent cross-sectional slices.

At step 1610, a geometric contour of the one or more features of interest is derived from data corresponding to the feature of interest in the two-dimensional data sets. For example, in some embodiments the geometric contour comprises a series of line segments (e.g., as described with respect to FIG. 11B). In some embodiments, the feature of interest is a web plane, and the series of line segments corresponds to a thickness-wise centerline along the walls of the web plane. In some embodiments, the feature of interest is plugged and/or unplugged cells proximate to the end faces in a filter, and the geometric contour is a cross-section through the plugged and/or unplugged cells (e.g., as described with respect to FIGS. 11A and 15A). In some embodiments, the cross-sectional line is a diagonal line between corner posts of the plugged and/or unplugged cells.

At step 1612, a two-dimensional or planar representation of the structural feature of interest is created from data extracted, e.g., by the one or more processors, from the from the three-dimensional volume file in accordance with the geometric contour derived in step 1612.

In some embodiments, each of the two-dimensional data sets (cross-sectional slices) of the three-dimensional volume file is analyzed by the one or more processors to identify web planes, such as intersecting horizontal and vertical web planes, where each of the web planes corresponds to a span of walls of the honeycomb structure 10. For example a "horizontal" image (planar representation) can be created based on extracted data from the three-dimensional volume file for each horizontal web plane identified in the two-dimensional data sets. Similarly, a "vertical" image (planar representation) can be created based on extracted data from the three-dimensional volume file for each vertical web plane identified in the two-dimensional data sets.

At step 1614, at least one structural condition of the honeycomb structure is identified by the one or more processors. In some embodiments, the structural condition is an irregularity-free condition. In some embodiments, an irregularity-free condition is determined based on a uniformity in intensity of data of the planar representation of the structural feature. In some embodiments, the structural condition is an irregularity. In some embodiments, the irregularity is determined as a nonuniformity in intensity of data of the planar representation of the structural feature.

Figure 17:
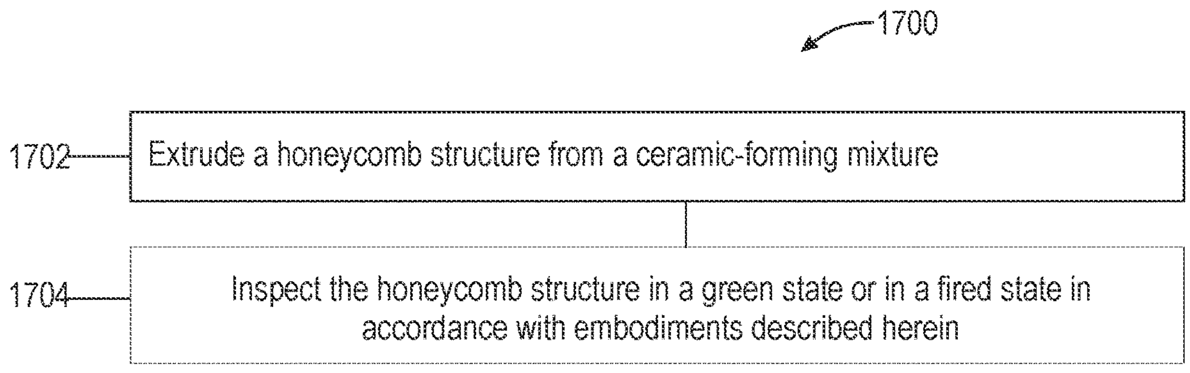
FIG. 17 depicts a flowchart of an example method of manufacturing a ceramic honeycomb structure, according to aspects of the present disclosure.

Referring to FIG. 17, a flowchart 1700 of an example method of manufacturing a ceramic honeycomb structure 10 is provided. The method 1700 starts at step 1702 in which a honeycomb structure is extruded from a ceramic-forming mixture. In step 1704, the honeycomb structure is inspected in accordance to one or more of the methods described herein, such as any embodiment of the method 1600. The step 1704 can occur when the honeycomb structure is in the green state (unfired) or in the fired stated after the honeycomb structure has been fired.

The systems and methods disclosed herein can be implemented via a commercial X-ray system, such as those with a 10-100-micron voxel size. The X-ray CT scanning parameters can be set based on a diameter, a height, and/or cell density of a honeycomb structure 10 in embodiments. Scanning power, number of images, filtering and/or timing are set by the analysis software described herein in embodiments. Control of X-ray CT scanning parameters can be useful to reduce the scan and reconstruction time while maintaining adequate contrast-to-noise ratios for discrimination of part structure and structural conditions. By configuring the systems and methods disclosed herein to suppress X-ray reconstruction noise and artifacts, the systems and methods can enable higher speed X-ray scanning operations.

The systems and methods disclosed herein provide a decreased analysis cycle time advantageously. In conventional systems, the time it takes to analyze a data set increases with the size of the data set, often non-linearly. For example, the systems and methods disclosed herein can be configured to: extract only those portions of the full volume data set that represent the webs, extract web position attributes only when geometry has changed significantly, and process the volume file data in parallel and concurrently. Such aspects make the systems and methods particularly well-suited for production type throughput. For example, the decreased analysis cycle time allows sampling a greater number of parts during an extrusion run. Part-to-part cycle times for analysis of standard GPF parts can be approximately 1 minute.

Figure 18:
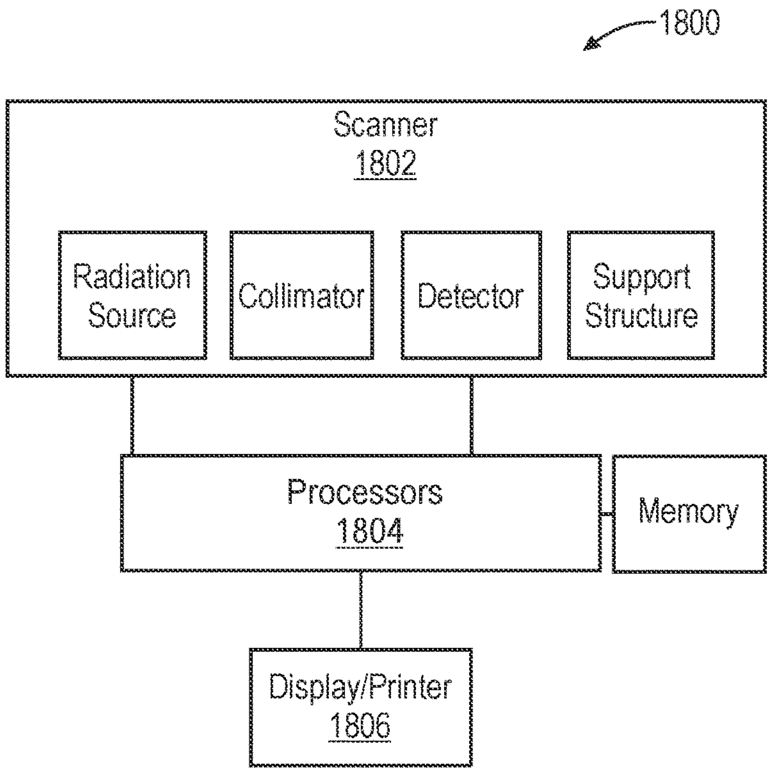
FIG. 18 depicts a view of an example inspection system for inspecting a honeycomb ceramic structure, according to aspects of the present disclosure.

FIG. 18 shows a block diagram of an inspection system 1800 for automatically inspecting a honeycomb structure 10. Embodiments of system 1800 comprise scanner 1802, one or more processors 1804, and a display and/or a printer 1806. Scanner 1802 comprises components of apparatus 400 described herein. For example, scanner 1802 comprises a radiation source, a collimator, a detector, and a support structure. In embodiments, the one or more processors 1804 comprise one or more system controllers to control the radiation source, the detector, and/or a positioning system. In embodiments, the one or more processors are part of a processor-based computing system that comprises a memory that is integrated within or otherwise connected to the one or more processors. Data collected from detector of scanner 1802 is accessed by the one or more processors 1804. In embodiments, the data is transmitted by the detector. In other embodiments, the data is retrieved by the one or more processors from the detector or another device. The one or more processors 1804 are communicably coupled with the radiation source. In embodiments, the one or more system controllers of the one or more processors control the operating parameters of the radiation source. The one or more system controllers also control the operating parameters of the detector. In embodiments, the one or more processors 1804 receive digital signals converted from analog signals by the detector or another device. In other embodiments, the one or more processors 1804 receive the analog signals from the detector and carry out the conversion to digital signals.

The one or more processors 1804 are configured to generate a three-dimensional volume file from two-dimensional X-ray images as described herein. The one or more processors 1804 are also configured to reduce the three-dimensional volume file to two-dimensional data sets, identify one or more regions of interest in the two-dimensional data sets, extract a two-dimensional manifold for each of the one or more regions of interest, and identify at least one structural condition of the honeycomb structure along the length of the honeycomb structure based on the two-dimensional manifolds for each of the one or more regions of interest.

A processor as referred to herein is a system of one or more electronic components which are statically or dynamically configured (in hardware or software) to implement an algorithm or process. Examples include systems based on microprocessors, application-specific integrated circuits (ASICs), field-programmable gate arrays (FPGAs), and/or discrete components.

In embodiments, the one or more processors 1804 are in communication with a display and/or printer 1806. The display can be embodied as an electronic display. One or more input devices, such as a keyboard, mouse, touch screen, light pen, etc., can be in communication with the one or more processors and/or display/printer 1806. In embodiments, one or more processors 1804 are connected to a network from which it may receive and/or transmit instructions, data, or data representing images.

In an exemplary embodiment, system 1800 further comprises a user operated workstation with customized analysis software, a data management system (e.g., a server on a LAN) and the ability to access the completed analysis data and/or images via a web portal.

As described herein, the systems and methods disclosed allow individual parts to be inspected at multiple stages of production to track defect sources. In embodiments, ceramic precursor raw material is inspected to identify whether foreign materials (e.g., metal particles) are embedded. In embodiments, green formed parts are inspected to identify geometric anomalies, metal inclusions, tears, and/or non-knitters. In embodiments, fired, unplugged parts are inspected to identify geometric anomalies, pin holes, tears, non-knitters, and/or cracks. In embodiments, fired, plugged parts are inspected to identify geometric anomalies, pin holes, tears, non-knitters, cracks, missing plugs, extra plugs, plug voids, plug dimples and/or measurements of plug length and/or effective plug. In embodiments, plugged parts after application of a metal catalyst washcoat are inspected to identify washcoat uniformity. In embodiments, plugged parts after use in an engine exhaust system are inspected to identify ash loading patterns.

The X-ray CT imaging and rapid contrast-based image analysis techniques disclosed herein provide product quality assurance, identify the presence of various types of internal defects in the part in a nondestructive manner, classify the defects into various defect categories, provide rapid feedback of inspection results to the manufacturing process to assist in identifying root causes, provide inspection of both plugged and unplugged filters, provide inspection of both green and fired parts, and inspect the ceramic precursor batch material and the ceramic batch slug. Additionally, the X-ray CT imaging and rapid contrast-based image analysis techniques disclosed herein perform anomaly and quality inspections in a fully automated matter, provide measurements of the number, location, and size of anomalies, provide measurements of plug features of GPF and DPF filter products, provide measurements of geometric uniformity of the internal structure of GPF and DPF filter products, perform inspection of GPF and DPF filters after application of metal washcoat catalysts, perform inspection of GPF and DPF filters after canning, and perform inspection of GPF and DPF filters after engine testing to evaluate ash loading uniformity.

The X-ray CT imaging and rapid contrast-based image analysis techniques disclosed herein can be applied to inspect GPF and DPF filters, the ceramic precursor material, the ceramic batch slug, extrusion dies, green (unfired) ceramic substrates, fired ceramic substrates, unplugged ceramic substrates, plugged ceramic substrates, plugged ceramic substrates that have been treated with a metal catalytic washcoat, plugged ceramic substrates that have been treated with a metal catalytic washcoat and canned for mounting in a vehicle exhaust system, and plugged ceramic substrates that have been treated with a metal catalytic washcoat and canned, mounted in the exhaust of a gas or diesel engine and exposed to the exhaust.

What is claimed is:

1. A method for inspecting a honeycomb structure comprising an array of intersecting walls, the walls extending transversely across the honeycomb structure in a plurality of web planes, the method comprising:

generating a three-dimensional volume file of the honeycomb structure from x-ray images;

reducing the three-dimensional volume file to two-dimensional data sets, the reducing comprising slicing the three-dimensional volume file into a sequence of cross-sectional slices, each cross-sectional slice having a thickness measured along an axial length of the honeycomb structure, and generating each of the two-dimensional data sets as axially-projected intensity data of a corresponding one of the cross-sectional slices of the three-dimensional volume file;

tracking one or more web planes through the three-dimensional volume file by identifying a portion of the one or more web planes in a plurality of the two-dimensional data sets;

generating a geometric contour of the one or more web planes from data corresponding to the one or more web planes in the two-dimensional data sets, the geometric contour comprising a series of line segments that travel along the walls for each web plane of the one or more web planes;

creating a planar representation of the one or more web planes by extracting data from the three-dimensional volume file in accordance with the geometric contour;

determining at least one structural condition of the honeycomb structure based on the planar representation; and wherein the generating the geometric contour comprises:

beginning a first line segment of the series of line segments at a thickness-wise center of a selected wall;

detecting a deviation in the thickness-wise center of the selected wall at a location along the selected wall spaced from the beginning of the first line segment;

terminating the first line segment at the location of the deviation; and beginning a second line segment of the series of line segments at an end of the first line segment.

2. The method of claim 1, wherein the deviation is determined as a distance or angle that is greater than a predetermined threshold value.

3. The method of claim 1, wherein the thickness of the cross-sectional slices is from 50 μm to 200 μm.

4. The method of claim 1, wherein the geometric contour of the one or more web planes is generated as a plurality of individual geometric contours that respectively correspond to each of the portions of the one or more web planes identified in the two-dimensional data sets of the cross-sectional slices.

5. The method of claim 4, wherein creating the planar representation comprises extracting intensity data from the three-dimensional volume file for each of the individual geometric contours and projecting the intensity data onto a plane in axial layers having the axial thicknesses of the cross-sectional slices corresponding to the two-dimensional data sets from which each of the individual geometric contours was generated.

6. The method of claim 1, further comprising orienting the three-dimensional volume file such that the one or more web planes can be followed along an axial length of the honeycomb structure.

7. The method of claim 1, wherein the at least one structural condition is at least one of an irregularity-free structure, a non-knit, a thin-web, an inclusion, a pin hole, a tear, a crack, a geometric variation, or a non-uniformity in any component added to the honeycomb structure.

8. The method of claim 7, further comprising determining a size of the at least one structural condition.

9. The method of claim 1, wherein determining the at least one structural condition comprises analyzing the planar representation for variations in intensity that are greater than a threshold variation value.

10. The method of claim 1, wherein the creating the planar representation further comprises filtering out regularly occurring variations in intensity on the planar representation that correspond to regular intersections between the walls along each of the one or more web planes.

11. The method of claim 1, wherein creating the planar representation further comprises determining or obtaining a global threshold value of intensity and suppressing at least one noisy area to increase a signal-to-noise ratio.

12. The method of claim 1, further comprising irradiating a periphery of the honeycomb structure with x-rays to generate the x-ray images.

13. The method of claim 12, wherein irradiating the periphery of the honeycomb structure comprises orienting the honeycomb structure at an angle relative to an axis of irradiation of a source of irradiation such that each x-ray image is at an angle relative to an end face of the honeycomb structure.

14. The method of claim 1, further comprising rotating data of the three-dimensional volume file to align the honeycomb structure with at least one analysis axis prior to reducing the three-dimensional volume file to two-dimensional data sets.

15. The method of claim 1, further comprising displaying, on a display, information of the at least one structural condition.

16. The method of claim 15, wherein displaying the information comprises displaying one or more indications indicative of a location of the at least one structural condition.

17. The method of claim 1, wherein identifying the portion of the one or more web planes comprises identifying plugged and unplugged cells of the honeycomb structure, and wherein identifying the plugged and unplugged cells comprises:

identifying locations of the walls and cell interiors between the walls;

taking a cross-section through each cell interior between the walls; and sampling intensity values of the three-dimensional volume file along the cross-section of each cell interior.

18. The method of claim 1, wherein the cross-section is taken diagonally through the cell interior.

19. The method of claim 17, further comprising displaying, on a display, at least one two-dimensional cross-sectional view of the identified plugged cells showing the at least one structural condition or one or more indications that are related to the at least one structural condition.

20. The method of claim 1, wherein the honeycomb structure is in a ceramic fired state or a ceramic green state.

21. A method of manufacturing a ceramic honeycomb structure comprising:

extruding a ceramic-forming mixture to form a honeycomb structure;

inspecting the honeycomb structure according to the method of claim 1.

22. The method of claim 21, wherein the inspecting occurs when the honeycomb structure is in a green state.

23. The method of claim 21, wherein the method further comprises firing the honeycomb structure, and wherein the inspecting occurs after the firing.

* * * * *